(12) United States Patent
Matsubara et al.

(10) Patent No.: US 8,805,562 B2
(45) Date of Patent: Aug. 12, 2014

(54) NUMERICAL CONTROL PROGRAMMING METHOD, APPARATUS THEREFOR, AND PROGRAM FOR CAUSING A COMPUTER TO EXECUTE THE METHOD

(75) Inventors: Susumu Matsubara, Tokyo (JP); Takashi Kamiya, Tokyo (JP); Kenji Iriguchi, Tokyo (JP); Hiroshi Katano, Nagoya (JP); Mahito Matsuura, Nagoya (JP)

(73) Assignee: Mitsubishi Electric Corporation, Tokyo (JP)

( * ) Notice: Subject to any disclaimer, the term of this patent is extended or adjusted under 35 U.S.C. 154(b) by 493 days.

(21) Appl. No.: 13/260,076

(22) PCT Filed: Jul. 6, 2009

(86) PCT No.: PCT/JP2009/003118
§ 371 (c)(1),
(2), (4) Date: Sep. 23, 2011

(87) PCT Pub. No.: WO2011/004420
PCT Pub. Date: Jan. 13, 2011

(65) Prior Publication Data
US 2012/0029675 A1    Feb. 2, 2012

(51) Int. Cl.
| | | |
|---|---|---|
| *B23B 3/00* | (2006.01) | |
| *B23C 3/32* | (2006.01) | |
| *B23Q 1/28* | (2006.01) | |
| *B23Q 11/00* | (2006.01) | |
| *G05B 19/18* | (2006.01) | |
| *G05B 19/19* | (2006.01) | |
| *G05B 19/4093* | (2006.01) | |
| *G05B 19/4097* | (2006.01) | |
| *G06F 17/50* | (2006.01) | |
| *G06F 19/00* | (2011.01) | |
| *G06T 15/00* | (2011.01) | |
| *G06T 17/00* | (2006.01) | |

(52) U.S. Cl.
CPC .......... *G05B 19/4097* (2013.01); *G05B 19/182* (2013.01); *G05B 19/184* (2013.01); *G05B 19/19* (2013.01); *G05B 19/4093* (2013.01); *G05B 2219/35162* (2013.01); *G05B 2219/35519* (2013.01)
USPC ............... 700/98; 700/97; 700/159; 700/160; 700/182; 700/184; 700/186; 700/193; 82/117; 82/118; 345/419; 345/420; 409/64; 409/73; 409/131; 703/1

(58) Field of Classification Search
CPC .... G05B 19/182; G05B 19/184; G05B 19/19; G05B 19/4093; G05B 19/4097; G05B 2219/35162; G05B 2219/35519
USPC ............. 700/97, 98, 159, 160, 182, 184, 186, 700/193; 82/117, 118; 345/419, 420; 409/64, 73, 131, 903; 703/1
See application file for complete search history.

(56) References Cited

U.S. PATENT DOCUMENTS

| | | | | | |
|---|---|---|---|---|---|
| 4,821,201 | A | * | 4/1989 | Kawamura et al. | 700/177 |
| 5,060,163 | A | * | 10/1991 | Matsumura | 700/180 |
| 5,136,903 | A | * | 8/1992 | Hibi | 82/1.11 |
| 5,272,622 | A | * | 12/1993 | Mizukami | 700/86 |
| 5,383,110 | A | | 1/1995 | Fujita et al. | |
| 5,815,400 | A | * | 9/1998 | Hirai et al. | 700/173 |
| 7,487,006 | B2 | * | 2/2009 | Kamiya et al. | 700/183 |
| 8,615,317 | B2 | * | 12/2013 | Neumaier et al. | 700/97 |
| 2002/0095236 | A1 | * | 7/2002 | Dundorf | 700/182 |
| 2003/0158621 | A1 | | 8/2003 | Matsubara et al. | |
| 2004/0083023 | A1 | | 4/2004 | Suh et al. | |
| 2006/0058908 | A1 | | 3/2006 | Kamiya et al. | |
| 2006/0064198 | A1 | * | 3/2006 | Fithian et al. | 700/187 |
| 2006/0247804 | A1 | | 11/2006 | Kamiya et al. | |
| 2006/0259181 | A1 | | 11/2006 | Kamiya et al. | |
| 2007/0027571 | A1 | | 2/2007 | Kamiya et al. | |
| 2007/0185607 | A1 | * | 8/2007 | Kamiya et al. | 700/180 |
| 2008/0154424 | A1 | | 6/2008 | Roders | |

FOREIGN PATENT DOCUMENTS

| | | | |
|---|---|---|---|
| EP | 1642675 A1 * | 4/2006 | |
| JP | 2-83140 A | 3/1990 | |
| JP | 2-139158 A | 5/1990 | |
| JP | 5-204432 A | 8/1993 | |
| JP | 9-218706 A | 8/1997 | |
| JP | 2003-241809 A | 8/2003 | |
| JP | 2006-53945 A | 2/2006 | |
| JP | 2006-068901 A | 3/2006 | |
| JP | 2007-505378 A | 3/2007 | |
| TW | 1260474 B | 8/2006 | |

OTHER PUBLICATIONS

Office Action dated Jul. 3, 2012, issued by the Taiwanese Patent Office in counterpart Application No. 098126147.

International Search Report (PCT/ISA/210) dated Aug. 25, 2009, in International Application No. PCT/JP2009/003118.

Written Opinion (PCT/ISA/237) dated Aug. 25, 2009, in International Application No. PCT/JP2009/003118.

* cited by examiner

*Primary Examiner* — Mohammad Ali
*Assistant Examiner* — Jennifer L Norton
(74) *Attorney, Agent, or Firm* — Sughrue Mion, PLLC; Richard C. Turner

(57) ABSTRACT

A level difference or a uncut portion is prevented from being left between adjoining worked regions without forming any useless worked region. A lathe sectional shape forming unit (222) produces a sheet model of a lathe sectional shape in an X-Z plane on the basis of the solid model of a lathe shape formed by a lathe shape forming unit (220). A first/second step working sectional shape forming unit (227) produces sheet models of the worked sectional shapes of the first step and the second step on the basis of the sheet model of the lathe sectional shape, a step dividing position and an overlap amount. A first step disused shape deleting unit (229) and a second step disused shape deleting unit (230) delete the shape needing no work, from the sheet models of the worked sectional shapes of the first step and the second step.

5 Claims, 36 Drawing Sheets

FIG. 4

| UNO. | UNIT | WORKING PORTION | ANGLE B | CUTTING-X | CUTTING-Z | COMPLETION VALUE-X | COMPLETION VALUE-Z | | |
|---|---|---|---|---|---|---|---|---|---|
| 1. | ROD MATERIAL | OUTER DIAMETER | 90. | 110. | 0. | 0. | 0. | | |
| SNO. | TOOL | | CALL | NO.# PATTERN | CUTTING 1 | CUTTING 2/TIME | CUTTING 3 | RESIDUE VALUE-X | RESIDUE VALUE-Z | PERIPHERAL SPEED | TRANS-PORTATION |
| R1 | LATHE | OUTER DIAMETER | 90. | | 5. | ♦ | ♦ | R/θ | ♦ | 120 | 0.45 | M |
| FIG PTN | FRONT CORNER | | STARTING POINT-X | STARTING POINT-Z | FINISHING POINT-X | FINISHING POINT-Z | REAR CORNER/$ | | ROUGH-NESS | | | |
| 1 TAPER | | | 50. | 0. | 90. | 30. | ♦ | ♦ | ▼▼ 4 | | | M |
| 2 LINES | | | ♦ | ♦ | 90. | 100. | ♦ | ♦ | ▼▼ 4 | | | M |

# NUMERICAL CONTROL PROGRAMMING METHOD, APPARATUS THEREFOR, AND PROGRAM FOR CAUSING A COMPUTER TO EXECUTE THE METHOD

TECHNICAL FIELD

The present invention relates to a numerical control programming method of automatically creating a working program for controlling a machine tool with a numerical control apparatus which grasps a material using a chuck of a first main spindle to perform the work of a first step and alternately grasps the material using a chuck of a second main spindle after the work of the first step to perform the work of a second step without generating uncut portion, an apparatus therefor, and a program for causing a computer to execute the method.

BACKGROUND ART

In the related art, in the case of working a product by a machine tool including a numerical control apparatus, a CAD drawing is first made which represents the shape of a work product which is an objective. A user determines a working step from the CAD drawing and makes working program manually or using automatic programming apparatus. The user inputs the working program into the machine tool including a numerical control apparatus and mounts a non-worked work to be worked on the machine tool manually or using work automatic exchanging apparatus. Moreover, the user performs setting of the pre-set for the tool used and the tool offset amount, and mounts the tool used on a tool magazine of the machine tool. Thereafter, by executing the working program, the work is worked and the product is manufactured. In order to automate this as much as possible and reflect the knowhow accumulated by the user in the working, various inventions have been made.

In the related art, as a technique for creating the working program in which uncut portion or the like is not generated, the following is suggested.

That is, as a first technique of the related art (a method of setting cutter trajectory), there is a proposal that a working target location modeled by a plurality of line segments, and a cutting region of a cutter by a preliminary trajectory overlap with each other, and the trajectory of the cutter is corrected so that all of the line segments are included in the cutting region of the cutter, thereby creating the working programming in which uncut portion is not generated (see Patent Document 1).

Furthermore, as a second related art (a control apparatus of the machine tool), there is a proposal that a boundary portion of the worked region be made to automatically overlap with an adjacent worked region and the tool is smoothly retracted from the overlap portion, thereby preventing a level difference at the boundary portion (see Patent Document 2).

Furthermore, as a third related art (a working method, a program writing apparatus therefor, and a working device), there is a proposal that, by moving the tool from a retracted position separated on the surface of the work in the adjacent region by a predetermined distance along a path facing a working start position of the working program where a non-worked portion of the work working target region is worked, the level difference generated on the working surface of the work is made gentle, and the working surface is smoothly continued (see Patent Document 3).

CITATION LIST

Patent Documents

[Patent Document 1] JP-A-02-083140
[Patent Document 2] JP-A-2006-068901
[Patent Document 3] JP-A-09-218706

SUMMARY OF INVENTION

Problem that the Invention is to Solve

However, such related arts had technical concepts to cause the worked regions to overlap with each other and to work the level difference smooth between the worked regions and eliminate uncut portion, but, since a shape is not removed which does not need to be worked in the overlap part, in some cases, an useless worked region may be formed in the overlap part.

Furthermore, according to the related arts, even in a case where uncut portion is not generated even when the overlap does not exist, an overlap between the adjacent worked regions is present, and thus, in some cases, a useless worked region may be formed.

The present invention was made in consideration of the above problems, and an object thereof is to provide a numerical control programming method which can prevent a level difference or uncut portion from being generated between adjacent worked regions without forming a useless worked region, an apparatus therefor, and a program for causing a computer to execute the method.

Means for Solving the Problem

In order to achieve the object, according to the present invention, there is provided a numerical control programming method of creating a working program for controlling a machine tool with a numerical control apparatus which grasps a material using a chuck of a first main spindle to perform the working of a first step and alternately grasps the material using a chuck of a second main spindle after the working of the first step to perform the working of a second step, the method including: a storing step of storing a solid model of a part shape, a solid model of a material shape, a step dividing position of the step, and an overlap amount between the steps; a lathe shape forming step of forming a solid model of a lathe shape on the basis of the solid model of the part shape; a lathe sectional shape forming step of forming a sheet model of a lathe sectional shape on the X-Z plane on the basis of the solid model of the lathe shape; a first/second step working sectional shape forming step of forming a sheet model of the lathe sectional shape of the first step and a sheet model of the lathe sectional shape of the second step on the basis of the sheet model of the lathe sectional shape, the step dividing position, and a overlap amount; a first step disused shape deleting step of analyzing the shape near the step dividing position and deleting the shape not needing to be worked in the overlap part of the lathe sectional shape of the first step from the sheet model of the lathe sectional shape of the first step; and a second step disused shape deleting step of analyzing the shape near the step dividing position and deleting the shape not needing to be worked in the overlap part of the lathe sectional shape of the second step from the sheet model of the lathe sectional shape of the second step.

Furthermore, the numerical control programming method according to the present invention automatically determines the overlap amount from tool information.

Furthermore, according to the present invention, there is provided a numerical control programming apparatus that creates a working program for controlling a machine tool with a numerical control apparatus which grasps a material using a chuck of a first main spindle to perform the working of a first step and alternately grasps the material using a chuck of a second main spindle after the working of the first step to perform the working of a second step, the apparatus including: a storing unit for storing a solid model of a part shape, a solid model of a material shape, a step dividing position of the step, and an overlap amount between the steps; a lathe shape forming unit for forming a solid model of a lathe shape on the basis of the solid model of the part shape; a lathe sectional shape forming unit for forming a sheet model of a lathe sectional shape on an X-Z plane on the basis of the solid model of the lathe shape; a first/second step working sectional shape forming unit for forming a sheet model of the lathe sectional shape of the first step and a sheet model of the lathe sectional shape of the second step on the basis of the sheet model of the lathe sectional shape, the step dividing position, and a overlap amount; a first step disused shape deleting unit for analyzing the shape near the step dividing position and deleting the shape not needing to be worked in the overlap part of the lathe sectional shape of the first step from the sheet model of the lathe sectional shape of the first step; and a second step disused shape deleting unit for analyzing the shape near the step dividing position and deleting the shape not needing to be worked in the overlap part of the lathe sectional shape of the second step from the sheet model of the lathe sectional shape of the second step.

Furthermore, the numerical control programming apparatus according to the present invention is further provided with an overlap amount determining unit for automatically determining the overlap amount from tool information.

Advantageous Effects of Invention

According to the present invention, it is possible to prevent a level difference or a uncut portion from being generated between the adjacent worked regions without forming a useless worked region.

Furthermore, according to the present invention, since the overlap amount is automatically determined from the tool information, a smaller useless overlap amount can be set.

BRIEF DESCRIPTION OF DRAWINGS

FIG. 4 is a diagram that shows an example of a working unit as one component of the working program to be formed by the numerical control programming apparatus according to the present invention.

DESCRIPTION OF EMBODIMENTS

Embodiment 1

Hereinafter, embodiment 1 of the present invention will be described using FIGS. 1 to 32.

Figure 1:
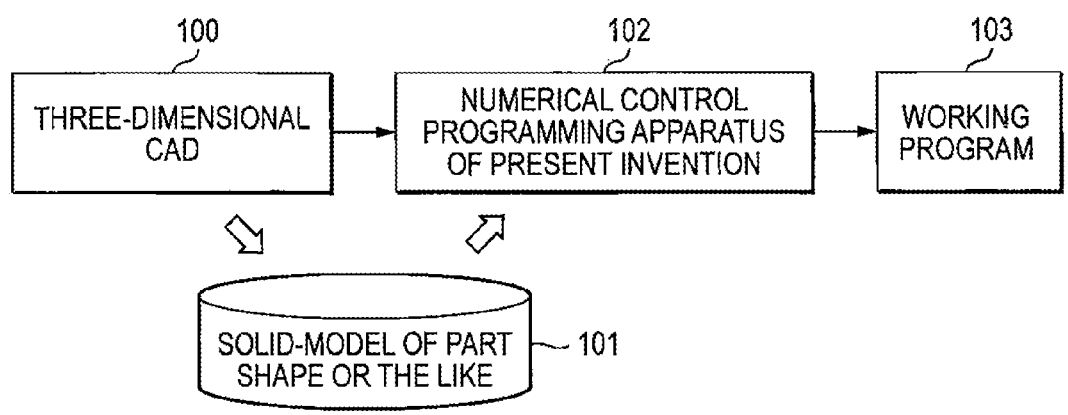
FIG. 1 is a configuration diagram that shows a CAD/CAM system to which a numerical control programming apparatus according to the present invention is applied.
Figure 2:
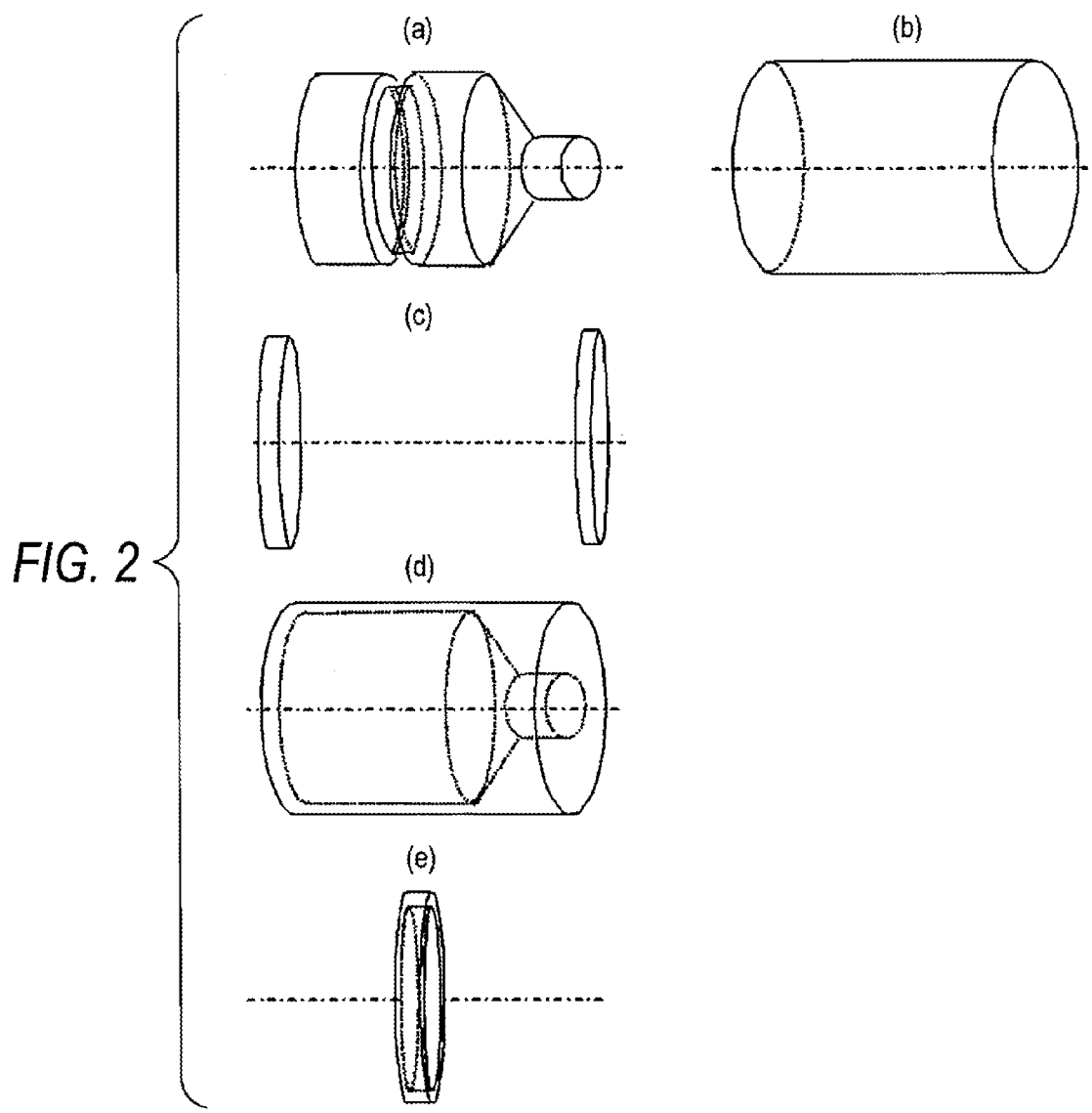
FIG. 2 is a diagram that shows a shape example to be worked by a working program formed in the numerical control programming apparatus according to the present invention.

FIG. 1 is a configuration diagram that shows a CAD (Computer Aided Design)/CAM (computer aided manufacturing) to which a numerical control programming apparatus 102 according to embodiment 1 of the present invention is applied. In FIG. 1, reference numeral 100 is a three-dimensional CAD that designs a part to form a solid model 101 or the like of a part shape or a material shape, reference numeral 101 is a solid model of a component shape of a material shape formed by the three-dimensional CAD 100, reference numeral 102 is a numerical control programming apparatus that forms a working program 103 on the basis of the solid model 101 of the part shape or the material shape, and reference numeral 103 is a working program that is formed by the numerical control programming apparatus 102.

In addition, the numerical control programming apparatus 102 is used in forming the working program of grasping the material using a chuck of a first main chuck to perform the working of a first step including the lathe, and alternately grasping the material using a chuck of a second main chuck to perform the working of a second step including the lathe after the working of the first step, by performing the numerical control of a milling machine with the numerical control apparatus including the capabilities of a machining center which performs a milling or a punching, in a machine tool, that is, a lathe that includes the first main spindle having the first chuck grasping a material and the second main spindle (facing the first main spindle) having the second chuck grasping a material and performs the lathe. Furthermore, the numerical control programming apparatus 102 has, for example, the same part shape as FIG. 2(a), and when the material shape is the same as that of FIG. 2(b), in some cases, the numerical control programming apparatus 102 is used in forming the working program 103 for performing a lathe sectional working of the same shape as FIG. 2(c), a lathe rod working of the same shape as FIG. 2(d), and a lathe grooving like FIG. 2(e).

Figure 3:
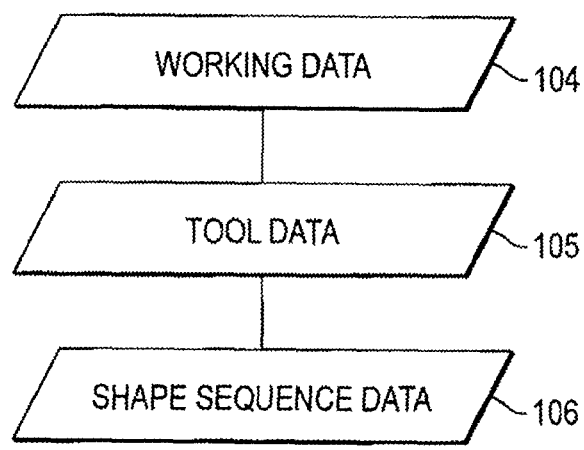
FIG. 3 is a diagram that shows a configuration example of a working unit as one component of the working program to be formed by the numerical control programming apparatus according to the present invention.

FIG. 3 is a configuration example that shows a working unit that is a component of the working program 103, a working data 104 is information of a working method, a tool data 105 is information of a tool used and a working condition, a shape sequence data 106 of a configuration of a single shape is shape information that defines a shape to be worked.

FIG. 4 is a diagram that shows an example of the working unit of the working program.

A program portion indicated by "Uno." is the working data 104, a program portion indicated by "SNo." is the tool data 105, and a program portion indicated by "FIG" is the shape sequence data 106.

Figure 5:
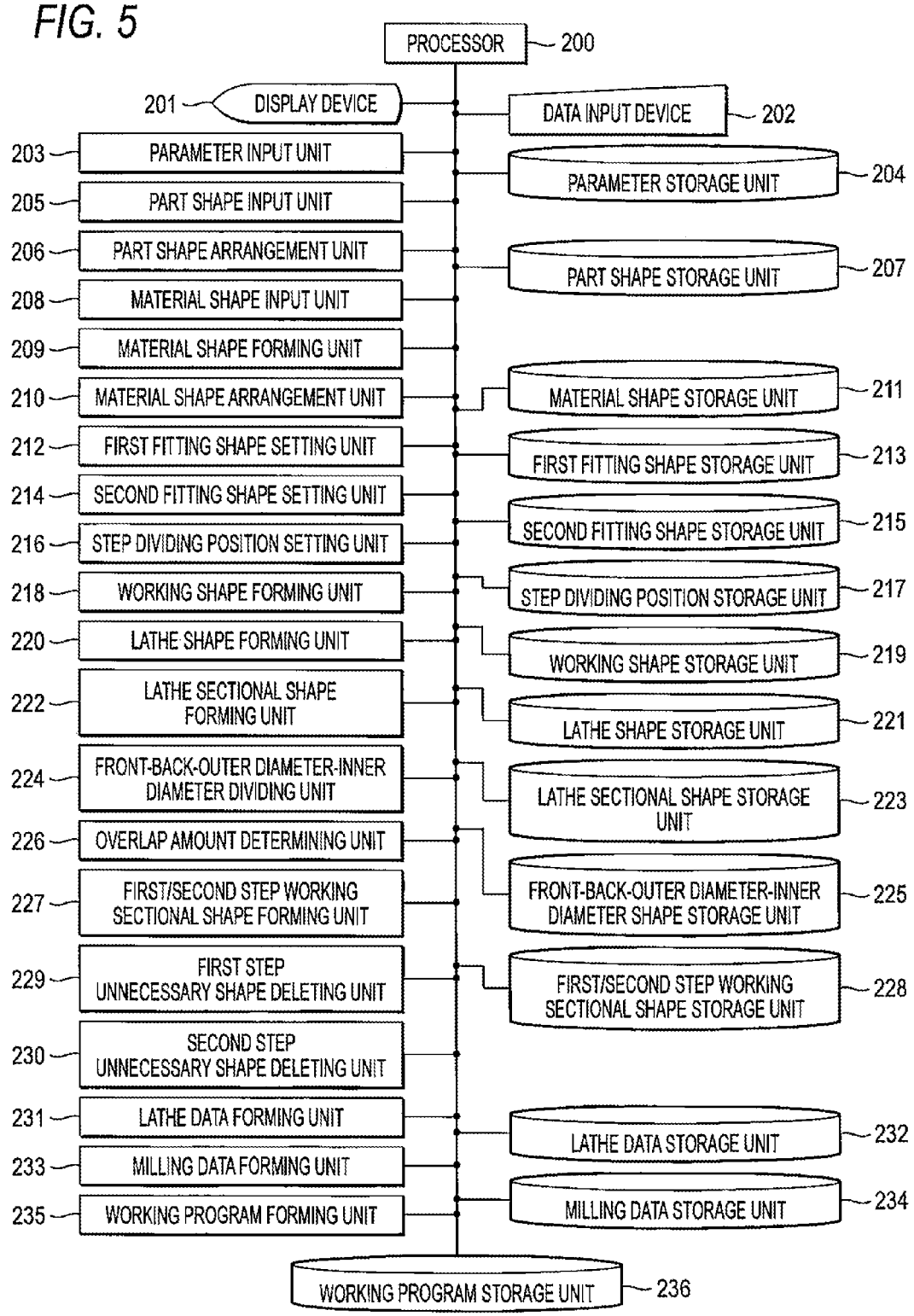
FIG. 5 is a block diagram that shows a configuration of the numerical control programming apparatus according to embodiment 1 of the present invention.

FIG. 5 is a configuration diagram that shows the numerical control programming apparatus 102 according to embodiment 1 of the present invention. In FIG. 5, reference numeral 200 is a processor that performs an overall control of the numerical control programming apparatus, reference numeral 202 is a data input device constituted by a keyboard or the like that receives the input or the like of a value set by a user, and reference numeral 201 is a display device that displays various data, working program or the like.

Reference numeral 203 is a unit for inputting a parameter used upon creating the working program or the like, and reference numeral 204 is a parameter storage unit that memorizes the input parameter. Reference numeral 205 is a part shape input unit by which a user inputs the solid model of the part shape formed by the three-dimensional CAD 100, a reference numeral 206 is a part shape arrangement unit that places the solid model of the input part shape on program coordinates, and reference numeral 207 is a part shape storage unit that memorizes the solid model of the part shape placed on the program coordinates.

Reference numeral 208 is a material shape input unit by which a user inputs the solid model of the material shape formed by the three-dimensional CAD 100, reference numeral 209 is a material shape forming unit for forming the material shape on the basis of the solid model of the part shape stored in the part shape storage unit 207, reference numeral 210 is a material shape arrangement unit that places the solid model of the material shape on the program coordinates, and reference numeral 211 is a material shape storage unit that memorizes the solid model of the material shape placed on the program coordinates.

Reference numeral 212 is a first fitting shape setting unit by which a user sets the solid model of a first fitting shape grasping the material shape upon performing the working in the first step, reference numeral 213 is a first fitting shape storage unit that memorizes the solid model of the set first fitting shape, reference numeral 214 is a second fitting shape setting unit by which a user sets the solid model of a second fitting shape grasping the material shape upon performing the working in the second step, reference numeral 215 is a second fitting shape storage unit that memorizes the solid model of the set second fitting shape, reference numeral 216 is a step dividing position setting unit by which a user sets a step dividing position between the first step worked initially and the second step worked next, and reference numeral 217 is a storage unit that memorizes the set step dividing position. In addition, in some cases, the step dividing position may be set manually by a user in consideration of the characteristics of the part shape or the like and may be automatically set.

Reference numeral 218 is a working shape forming unit for forming the solid model of the working shape from the solid model of the part shape stored in the part shape storage unit 207 and the solid model of the material shape stored by the material shape storage unit 211, and reference numeral 219 is a working shape storage unit that memorizes the solid model of the formed working shape.

Reference numeral 220 is a lathe shape forming unit for forming the solid model of the lathe shape showing the shape constituted by the lathe surface performing the lathe from the solid model of the part shape stored in the part shape storage unit 207. Reference numeral 221 is a lathe shape storage unit that memorizes the solid model of the lathe shape.

Reference numeral 222 is a lathe sectional shape forming unit for forming a sheet model of the lathe sectional shape from the solid model of the lathe shape stored in the lathe shape storage unit 221 and the solid model of the material shape stored in the material shape storage unit 211. Reference numeral 223 is a lathe sectional shape storage unit that memorizes sheet model of the formed lathe sectional shape.

Reference numeral 224 is a the front, back, outer diameter, and inner diameter dividing unit for dividing the sheet model of the lathe sectional shape stored in the lathe sectional shape storage unit 223 into a sheet model of a front portion lathe sectional shape, a sheet model of a back portion lathe sectional shape, a sheet model of an outer diameter lathe sectional shape, and a sheet model of an inner diameter lathe sectional shape, by the use of the solid model of the part shape stored in the part shape storage unit 207. Reference numeral 225 is a the front, back, outer diameter, and inner diameter shape storage unit that memorizes the divided sheet model of the front portion lathe sectional shape, the sheet model of the back portion lathe sectional shape, the sheet model of the outer diameter lathe sectional shape, and the sheet model of the inner diameter lathe sectional shape.

Reference numeral 226 is an overlap amount determining unit for determining whether an overlap amount is determined by an overlap amount housed in the parameter storage unit 204 in advance or an overlap amount is determined from information of the tool used. Reference numeral 227 is a first/second step working sectional shape forming unit for forming a sheet model of the first step working sectional shape showing the shape performing the working of the first step and a sheet model of the second step working sectional shape showing the shape performing the working of the second step, from the solid model of the part shape stored in the part shape storage unit 207, the sheet model of the outer diameter portion lathe sectional shape stored in the front, back, outer diameter, and inner diameter shape storage unit 225, the sheet model of the inner diameter portion lathe sectional shape stored in the front, back, outer diameter, and inner diameter shape storage unit 225, the step dividing position stored in the step dividing position storage unit 217, and the overlap amount stored in the parameter storage unit 204. Reference numeral 228 is a first/second step working sectional shape storage unit that memorizes the sheet model of the formed first step working sectional shape and the sheet model of the second step working sectional shape.

Reference numeral 229 is a first step unnecessary shape deleting unit for deleting the shape useless as the first step working from the part shape stored in the part shape storage unit 207, the first step working sectional shape stored in the first/second step working sectional shape forming unit 227, and the step dividing position stored in the step dividing position storage unit 217, and storing the deleted sectional shape in the first/second step working sectional shape storage unit 228.

Reference numeral 230 is a second step unnecessary shape deleting unit for deleting the shape which becomes useless as the second step working from the part shape stored in the part shape storage unit 207, the second step working sectional shape stored in the first/second step working sectional shape storage unit 228, and the step dividing position stored in the step dividing position storage unit 217, and storing the deleted sectional shape in the first/second step working sectional shape storage unit 228.

Reference numeral 231 is a lathe data forming unit for forming the lathe data showing the shape performing the lathe from the solid model of the part shape stored in the part shape storage unit 207, the sheet model of the first step working sectional shape stored in the first/second step working sectional shape storage unit 228, and the sheet model of the second step working sectional shape stored in the first/second step working sectional shape storage unit 228. Reference numeral 232 is a lathe data storage unit that memorizes the formed lathe data.

Reference numeral 233 is a milling data forming unit for forming the working data performing a point working, a line working, and a plane working from the solid model of the part shape stored in the part shape storage unit 207, the solid model of the working shape stored in the working shape storage unit 219, and the lathe data stored in the lathe data storage unit 232. Reference numeral 234 is a milling data storage unit that memorizes the formed milling data.

Reference numeral 235 is a working program forming unit for sequentially aligning the working program for performing the working of the first step and the working program for performing the working performing the second step from the lathe data stored in the lathe data storage unit 232 and the milling data stored in the milling data storage unit 234, and forming the working programs as one working program. Reference numeral 236 is a working program storage unit that memorizes the formed working program.

In addition, the respective unit are mainly constituted by software.

Furthermore, hereinafter, the solid model of the part shape is called a part shape, the solid model of the material shape is called a material shape, the solid model of the first fitting shape is called a first fitting shape, the solid model of the second fitting shape is called a second fitting shape, the solid model of the working shape is called a working shape, the solid model of the lathe is called a lathe shape, the sheet model of the lathe sectional shape is called a lathe sectional shape, the sheet model of the front portion lathe sectional shape is called a front portion lathe sectional shape, the sheet model of the back portion lathe sectional shape is called a back lathe sectional shape, the sheet model of the outer diameter portion lathe sectional shape is called an outer diameter portion lathe sectional shape, the sheet of the inner diameter portion lathe sectional shape is called an inner diameter portion lathe sectional shape, the sheet model of the first step working sectional shape is called a first step working sectional shape, and the sheet model of the second step working sectional shape is called a second step working sectional shape.

Next, an operation of the numerical control programming apparatus 102 will be described.

Firstly, a user operates the parameter input unit 203, sets parameter such as an overlap amount between the steps, an end surface cut-off amount, tool information, and a material required upon forming the working data, and memorizes them in the parameter storage unit 204.

Next, a user operates the part shape input unit 205, and inputs the part shape formed by the three-dimensional CAD 100. In addition, when the part shape is not formed by the three-dimensional CAD 100 of the part shape, a user may operate the part shape input unit 205, form and input the part shape.

Next, an intermediate position of the part shape in the X-axis direction, an intermediate position of the part shape in the Y-axis direction, and an intermediate position of the part shape in the Z-axis direction are obtained from an X-axis direction size, a Y-axis direction size, and a Z-axis direction size by the part shape arrangement unit 206, an X coordinate value of the intermediate position in the X-axis direction, a Y coordinate value of the intermediate position in the Y-axis direction, and a Z coordinate value of the intermediate position in the Z-axis direction are set to the X coordinate value, the Y coordinate value, and the Z coordinate value of the center position coordinates of the part shape, and the part shape is translated so that the center position coordinates of the part shape is situated on the Z axis. Furthermore, by translating the part shape so that the end surface in the −Z-axis direction of the part shape becomes Z=0.0, the part shape is arranged on the programming coordinates, and the part shape arranged on the programming coordinates is stored in the part shape storage unit 207.

In addition, the X-axis direction size, the Y-axis direction size, and the Z-axis direction size of the part shape can be obtained by geometrically analyzing the part shape.

Figure 6:
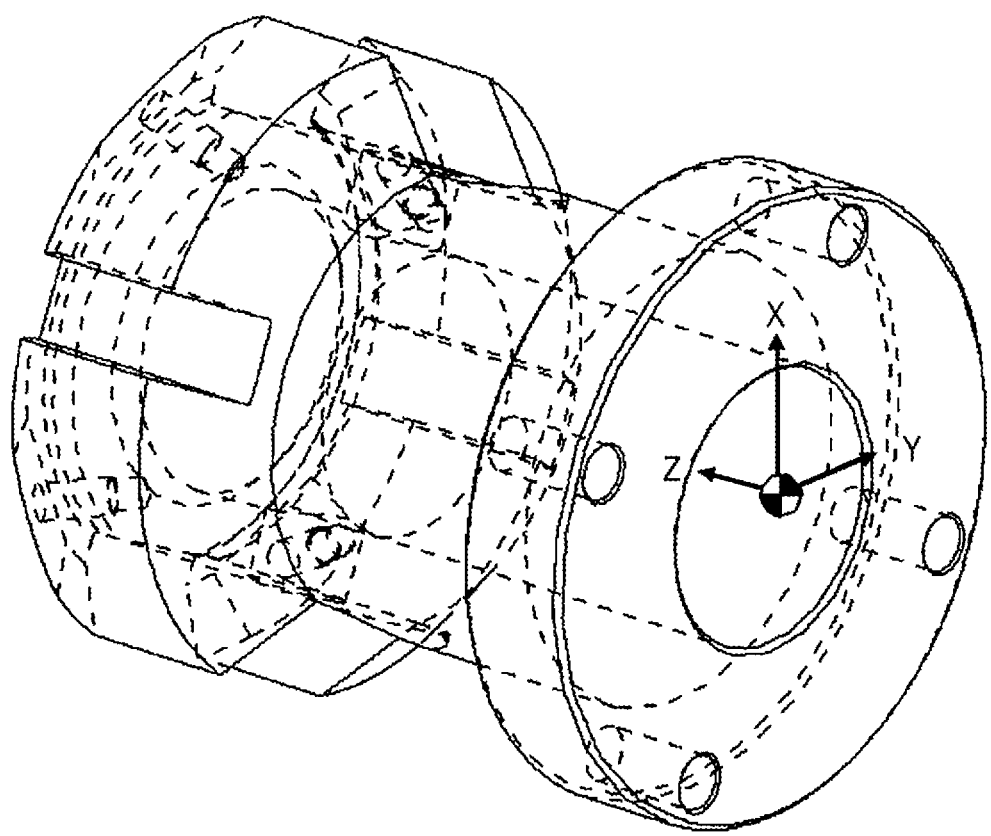
FIG. 6 is a diagram that shows an example of a part shape placed on a programming coordinates for describing operations of a part shape input unit and a part shape placement unit according to embodiment 1 of the present invention.

FIG. 6 is a perspective view that shows an example of the part shape placed on the programming coordinates.

Next, a user operates the material shape input unit 208, inputs the material shape formed by the three-dimensional CAD 100, obtains the intermediate position in the X-axis direction, the intermediate position in the Y-axis direction, and the intermediate position in the Z-axis direction of the material shape from the X-axis direction size, the Y-axis direction size, and the Z-axis direction size of the material shape by the material shape arrangement unit 210, sets the X coordinate value of the intermediate position in the X-axis direction, the Y coordinate value of the intermediate position in the Y-axis direction, and the Z coordinate value of the intermediate position in the Z-axis direction of the material shape to the X coordinate value, the Y coordinate value, and the Z coordinate value of the center position coordinates of the material shape, translates the material shape so that the center position coordinates of the material shape coincide with the center position coordinates of the part shape placed on the programming coordinates stored in the part shape storage unit 207, and memorizes the material shape placed on the programming coordinates in the material shape storage unit 211.

In addition, the X-axis direction size, the Y-axis direction size, and the Y-axis direction size of the material shape can be obtained by geometrically analyzing the part shape.

However, when the material shape is not formed by the three-dimensional CAD 100, the material shape forming unit 209 forms the material shape, translates the formed material shape to the program coordinates by the material shape arrangement unit 210, and memorizes the formed material shape on the material shape storage unit 211.

Figure 7:
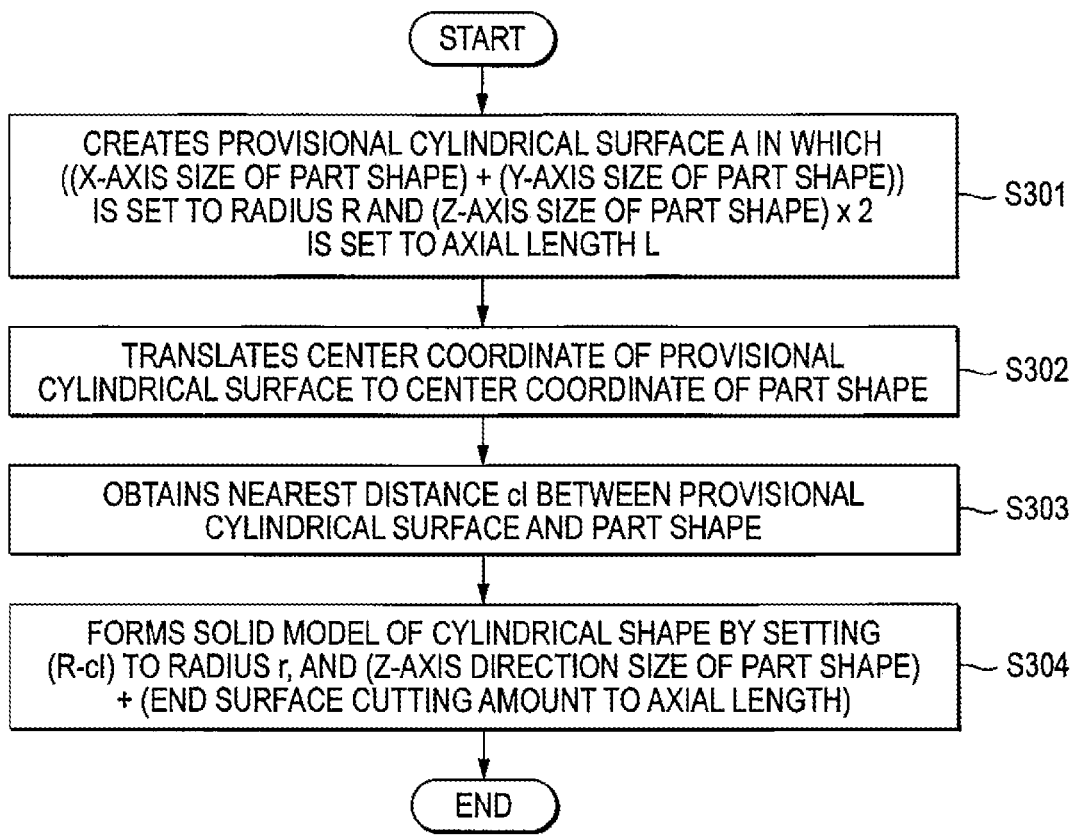
FIG. 7 is a flow chart for describing a material shape forming unit according to embodiment 1 of the present invention.
Figure 8:
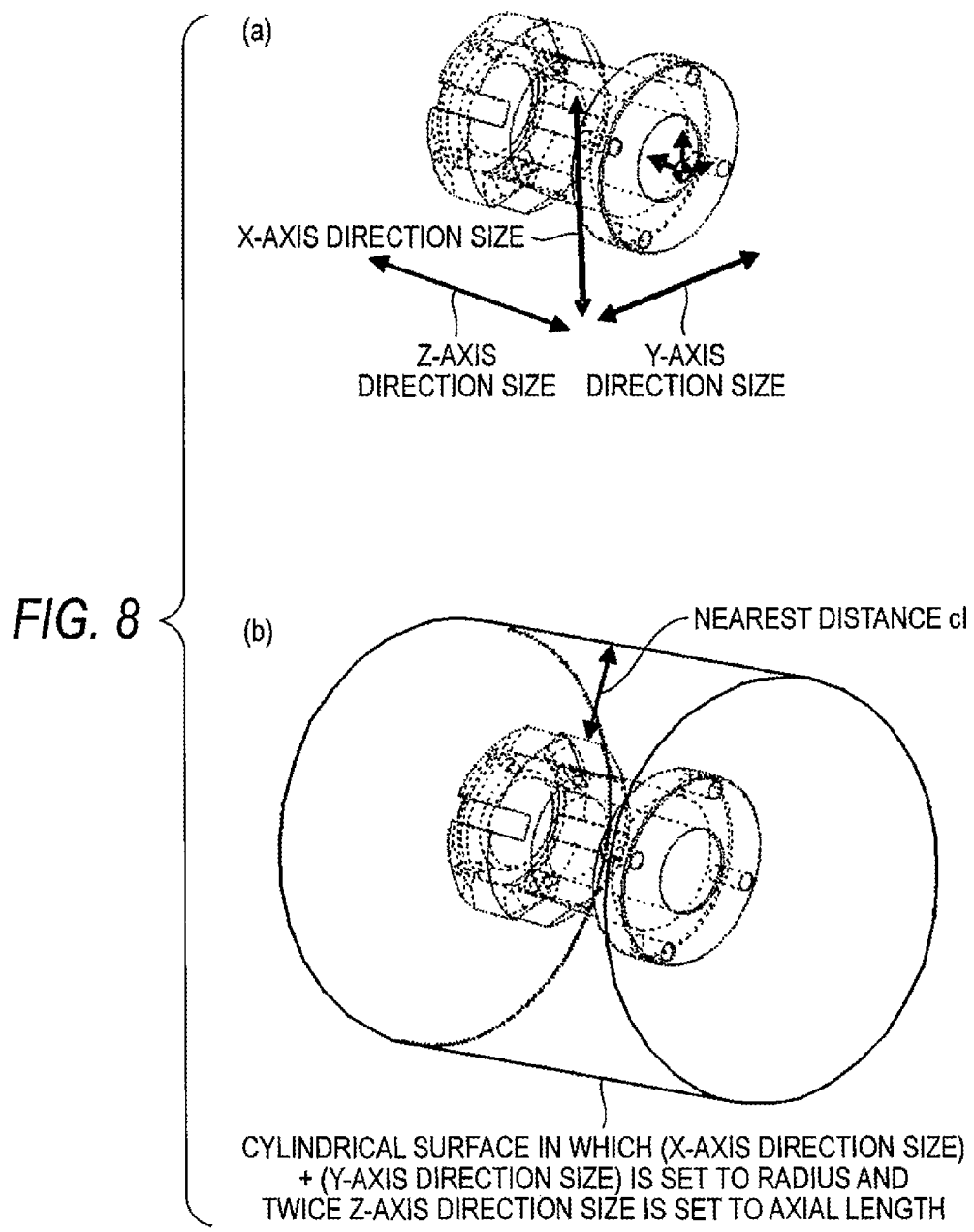
FIG. 8 is a diagram for providing a supplementary explanation of the operation of the material shape forming unit according to embodiment 1 of the present invention.

FIG. 7 is a flow chart for describing the material shape forming unit 209, FIG. 8(*a*) is a perspective view that shows an example in the X-axis direction size, the Y-axis direction size, and the Z-axis direction size of the part shape, and FIG. 8(*b*) is a perspective view that shows an example of the part shape and a provisional cylindrical shape. Hereinafter, the operation of the material shape forming unit 209 will be described based on the drawings. That is, as shown in FIG. 7, in order to form a column having a diameter that is sufficiently greater than that of the part shape, a provisional cylindrical surface A setting the Z-axis as an axial center is formed in which a value of adding the X-axis direction size of the part shape in the Y-axis directions size of the part shape is set to a radius R and twice the Z-axis direction size of the part shape is set to an axial length L (step S301).

Next, the center coordinates of the provisional cylindrical surface A are translated to the center coordinates of the part shape (step S302).

Next, the nearest distance cl between the cylindrical surface A and the part shape is obtained by the geometric analysis (step S303).

Next, a value of subtracting the nearest distance cl from the radius R of the cylindrical surface A is a radius r of the material shape, and a value of adding an end surface cut-off amount stored in the parameter storage unit 204 to the Z-axis direction size of the part shape is an axial length 1 of the material shape, whereby a solid model of a cylindrical shape having the radius r of the material shape and the axial direction 1 of the material shape is formed, and the solid model of the cylindrical shape is set to the solid model of the material shape (step S304). Hereinafter, the solid model of the material shape is called the material shape.

By the method, when lathe the part shape, it is possible to obtain a minimum value of the material shape including the part shape.

Next, by the material shape arrangement unit 210, the intermediate position in the X-axis direction, the intermediate position in the Y-axis direction, and the intermediate position in the Z-axis direction are obtained from the X-axis direction size, the Y-axis direction size, and the Z-axis direction size of the material shape formed by the material shape forming unit 209, the X coordinate value of the intermediate position in the X-axis direction, the Y coordinate value of the intermediate position in the Y-axis direction, and the Z coordinate value of the intermediate position in the Z-axis direction are set to the X coordinate value, the Y coordinate value, and the Z coordinate value of the center position coordinates of the part shape, the material is translated so that the center coordinates of the material shape coincide with the center coordinates of the part shape placed on the programming coordinates stored in the part shape storage unit 207, and the material shape placed on the programming coordinates is stored in the material shape storage unit 211.

That is, when lathe the part shape the minimum value of the material shape including the part shape can be obtained by the material shape forming unit 209, and the material shape can be placed so as to include the part shape by the material shape arrangement unit 210.

Figure 9:
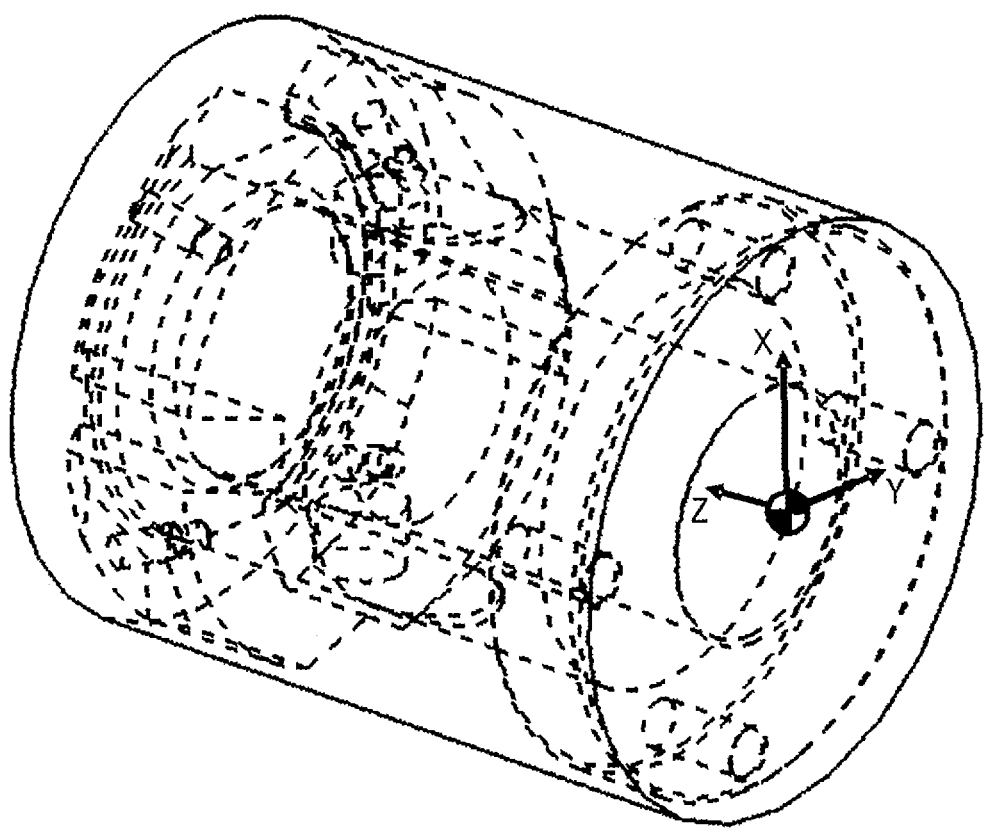
FIG. 9 is a perspective view for describing a relationship between a part shape and a material shape for describing the operation of the material shape placement unit according to embodiment 1 of the present invention.

FIG. 9 is a perspective view that shows an example of a relationship between the part shape and the material shape.

Figure 10:
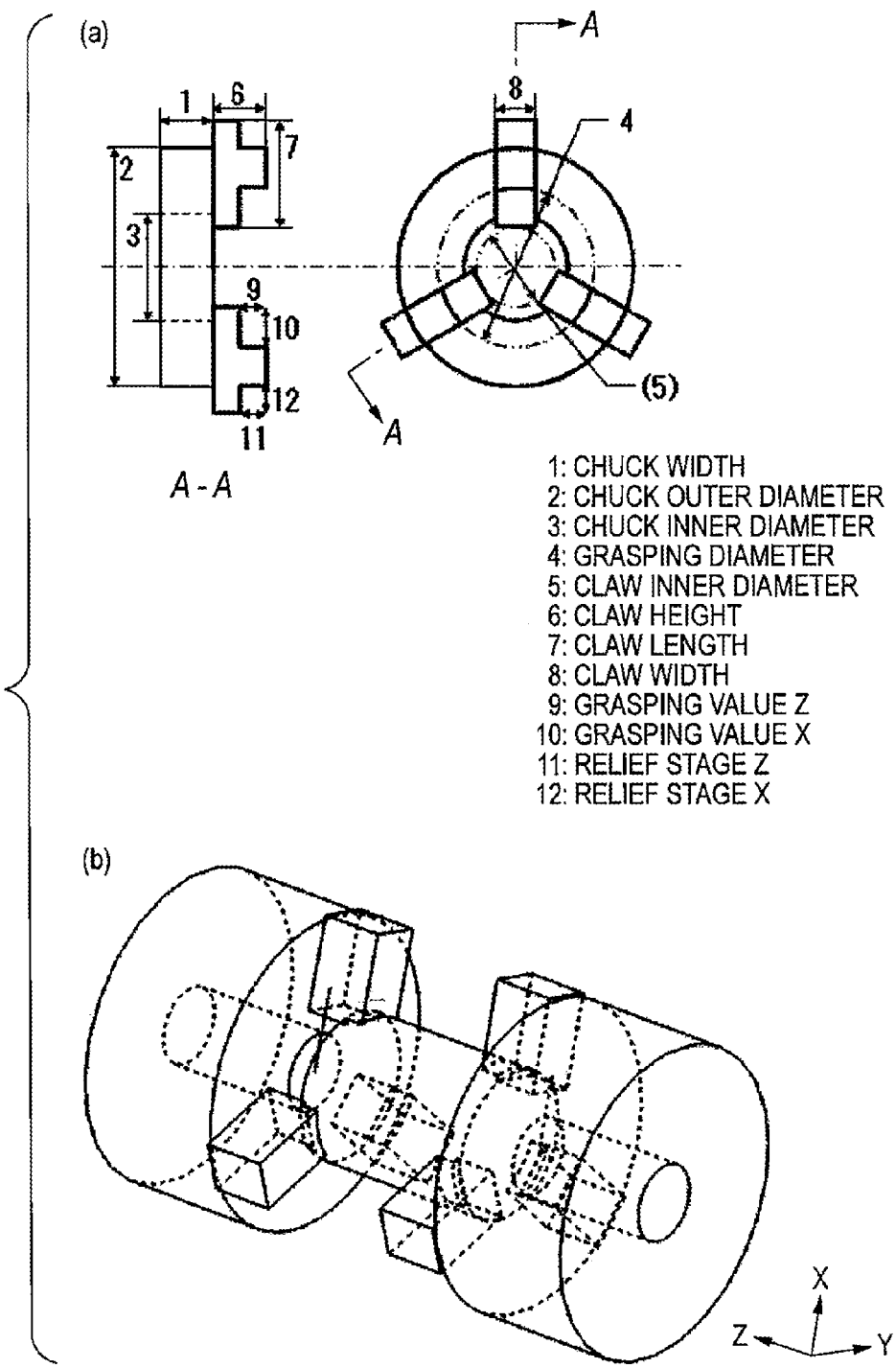
FIG. 10 is a diagram that shows an example of a material fitting shape of machine working the material and a size thereof for describing the operation of first and second fitting shape setting unit according to Embodiment 1 of the present invention, and a relationship between the first fitting shape and the second fitting shape of machine working the material and the material shape.

Next, a user operates the first fitting shape setting unit 212, as shown in FIG. 10, the first fitting shape sets each value of an outer claw, an inner claw, a grasping diameter, number of claws, a claw inner diameter, a claw height, a claw length, a claw width, a grasping value Z, a grasping value X, a relief stage Z, and a relief stage X, forms the solid model of the first fitting shape, and memorizes them in the first fitting shape storage unit 213. In addition, the first fitting is specifically a chuck and is used for grasping the material during working of the first step.

Next, a user operates the second fitting shape setting unit 214, the second fitting shape sets each value of an outer claw, an inner claw, a grasping diameter, a number of claws, a claw inner diameter, a claw height, a claw length, a claw width, a grasping value Z, a grasping value X, a relief stage Z, and a relief stage X, forms the solid model of the second fitting shape, and memorizes them in the second fitting shape storage unit 215. In addition, the second fitting is specifically a chuck and is placed opposite to the first fitting so as to grasp the material during working of the second step.

That is, it is possible to form the working program including the arrangement information including the first fitting shape by the first fitting shape setting unit 212, and it is possible to form the working program including the arrangement program including the second fitting shape by the second fitting shape setting unit 214.

In addition, FIG. 10(a) is a diagram that shows an example of a size of the fitting shape, and FIG. 10(b) is a perspective view that shows a relationship between the first fitting shape and the second fitting shape.

Furthermore, a user operates the step dividing position setting unit 216, sets the Z coordinate value of the step dividing position of the first step and the second step, and memorizes them in the step dividing position storage unit 217. In addition, the step dividing position is also set automatically in consideration of the characteristics such as the part shape.

Figure 11:
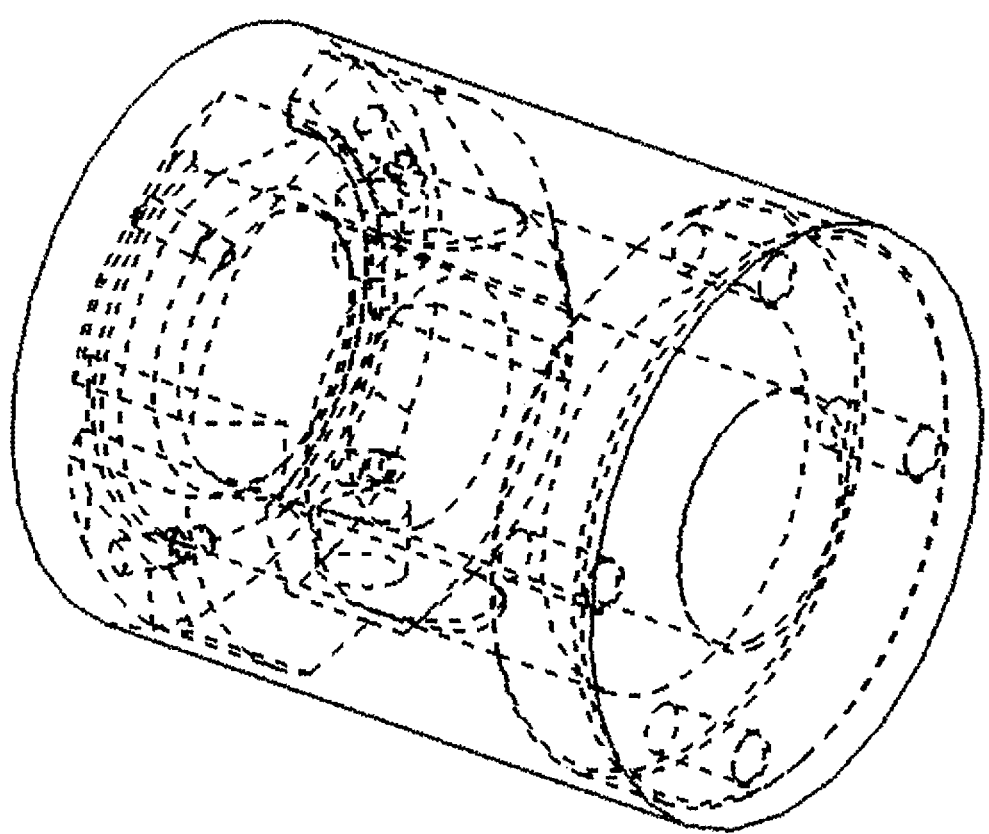
FIG. 11 is a diagram that shows an example of a working shape for describing the operation of the working shape forming unit according to embodiment 1 of the present invention.

Next, when the part shape and the material shape are stored in the part shape storage unit 207 and the material shape storage unit 211, respectively, as shown in FIG. 11, the working shape forming unit 218 performs the subtraction calculation of subtracting the part shape from the material shape to form the working shape, and memorizes the working shape in the working shape storage unit 219.

Figure 12:
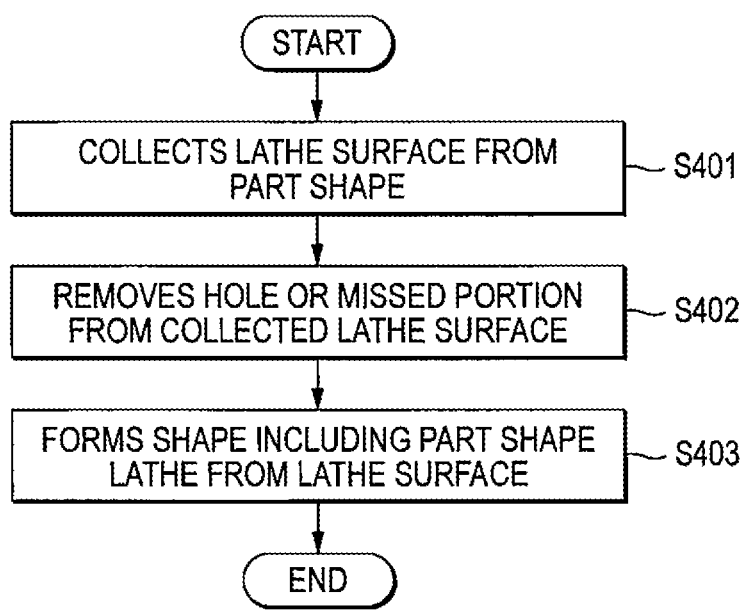
FIG. 12 is a flow chart for describing the operation of the lathe shape forming unit according to embodiment 1 of the present invention.
Figure 13:
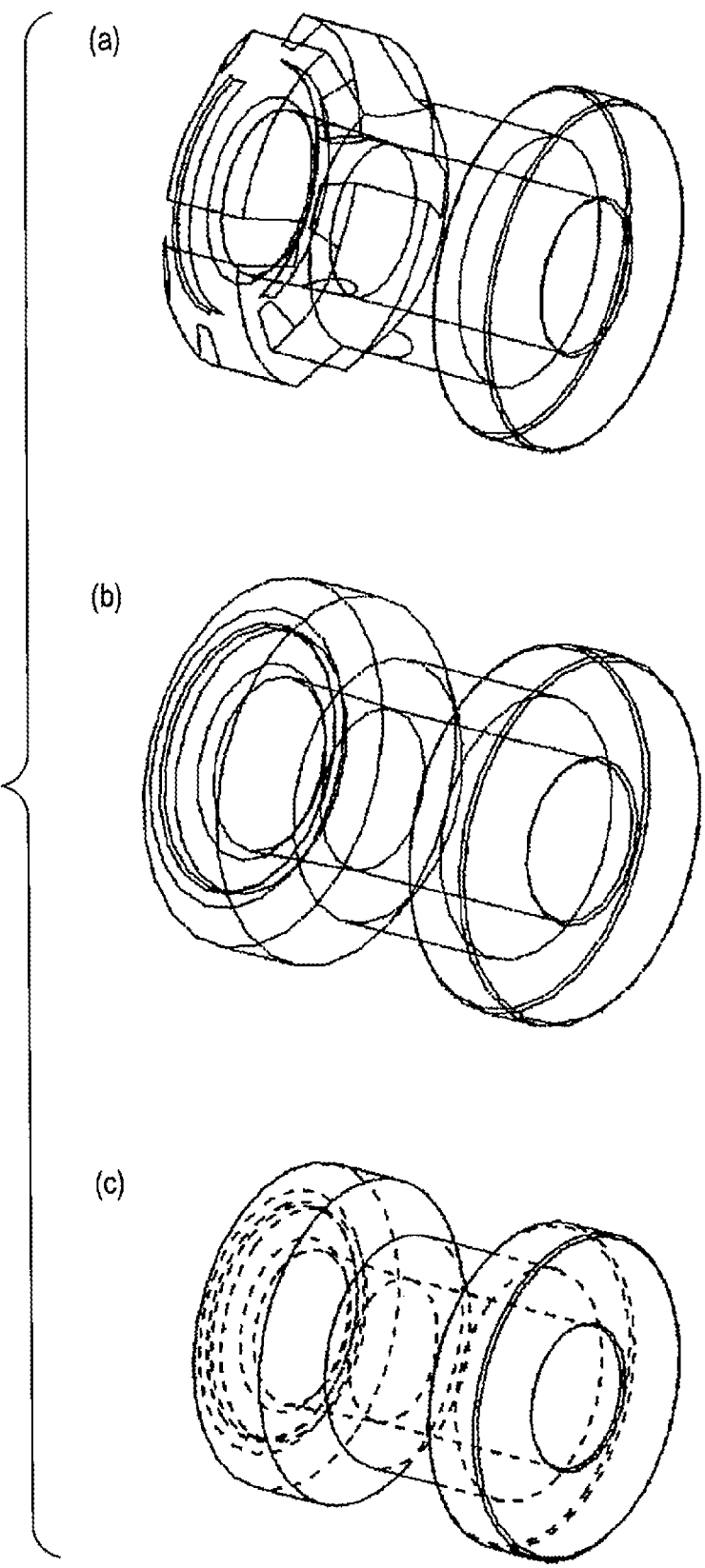
FIG. 13 is a diagram that shows a procedure in which the lathe shape is formed by the lathe shape forming unit according to embodiment 1 of the present invention.

Furthermore, when the part shape is stored in the part shape storage unit 207, as shown in FIGS. 12 and 13, the lathe shape forming unit 220 forms the lathe shape (the shape including the part shape lathe).

That is, as shown in FIG. 12, in order to form the lathe shape from the part shape, the lathe shape forming unit 220 extracts a conical surface (CONE), a cylindrical surface (CYLINDER), and an annular surface (TORUS) as the lathe surface from the solid model of the part shape stored in the part shape storage unit 207 (step S401).

FIG. 13(a) is a perspective view that shows an example of the lathe surface extracted from the part shape.

Next, in order to remove a portion missing from a hole of the extracted lathe surface or a uv parameter space, a minimum value and a maximum value within the uv parameter space are obtained. The minimum value and the maximum value in the uv parameter space are obtained by geometrically analyzing the lathe surface. By forming the lathe surface so that the minimum and the maximum value of the v direction, and u direction are in the range of 0 radians to $2\pi$ radians, the lathe surface is formed without a hole or a missed portion (step S402).

FIG. 13(b) is a perspective view that shows an example of the lathe surface having no holes or missed portions formed from the lathe surface extracted from the part shape.

Next, since only the lathe surface is a sheet, the surface is formed so as to block the end surfaces of both ends of the v direction of the lathe surface, by forming the lathe surface from the sheet to the solid, the solid model of the lathe shape by the lathe surface of the part shape is formed, and the same is stored in the lathe shape storage unit 221 (step S403). In addition, hereinafter, the solid model of the lathe shape by the lathe surface of the part shape is called a shape including the part shape lathe.

FIG. 13(c) is a diagram that shows an example of the shape including the part shape lathe.

Figure 14:
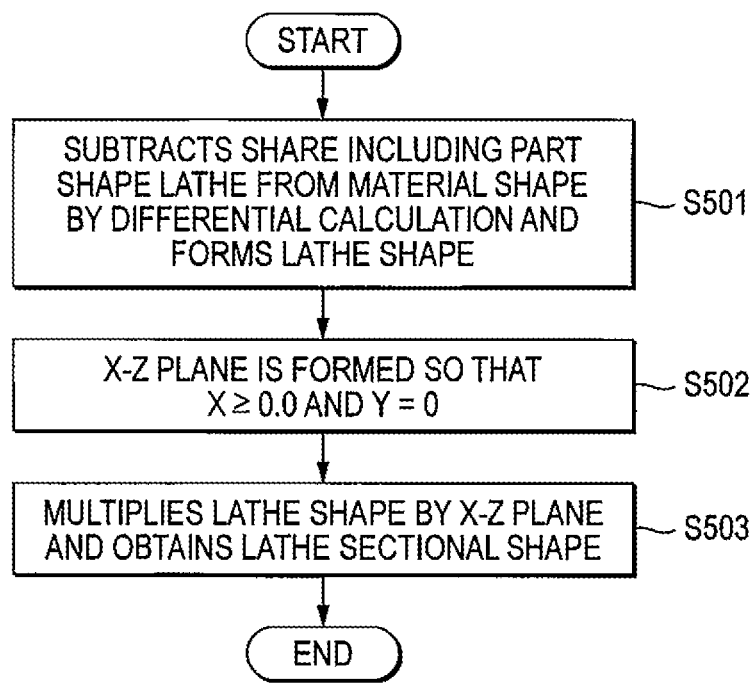
FIG. 14 is a flow chart for describing the operation of the lathe sectional shape forming unit according to embodiment 1 of the present invention.
Figure 15:
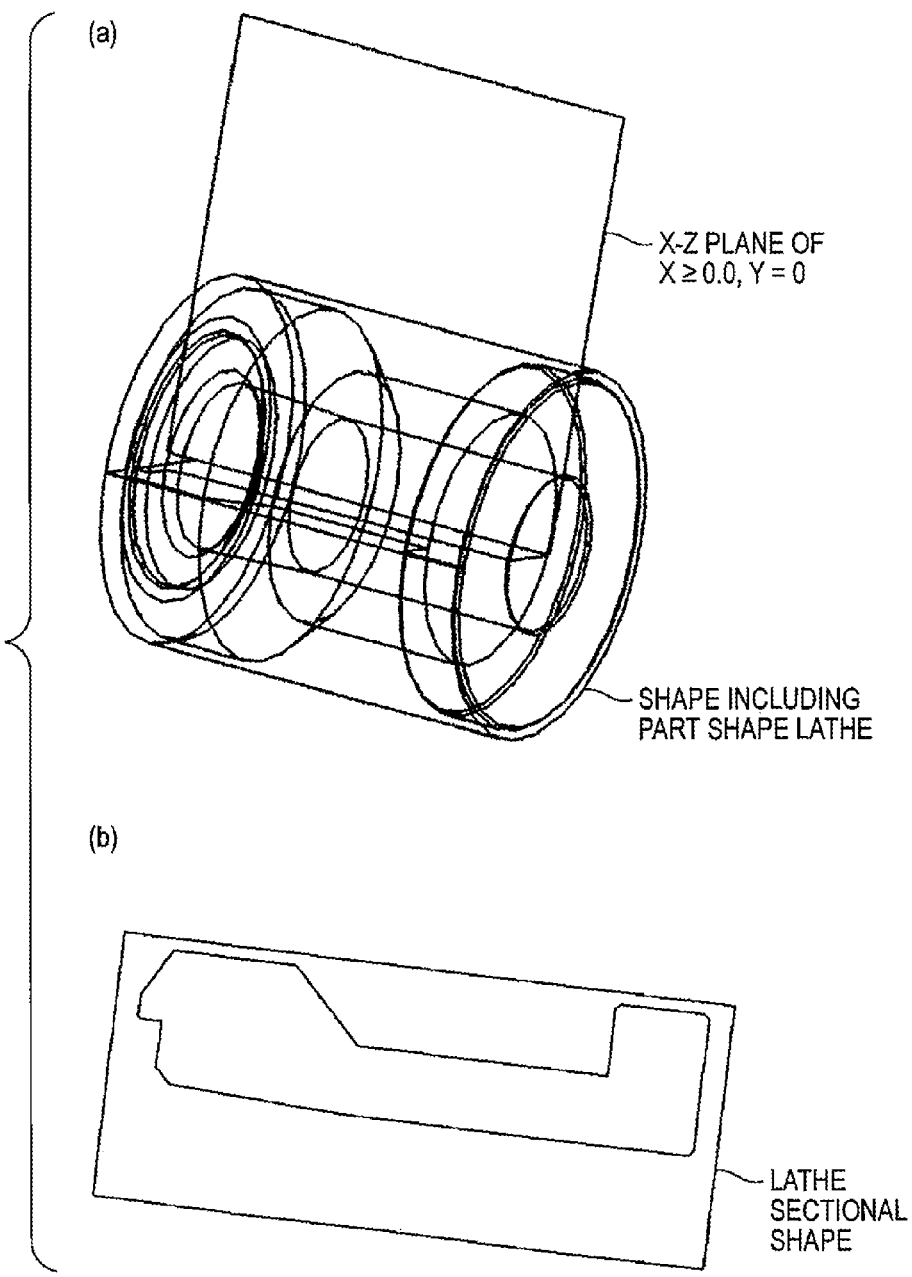
FIG. 15 is a diagram for providing a supplementary explanation of the operation of the lathe sectional shape forming unit according to embodiment 1 of the present invention.

Furthermore, when the shape including the part shape lathe is stored in the lathe shape storage unit 221, the lathe sectional shape forming unit 222 forms the lathe sectional shape as shown in FIGS. 14 and 15.

That is, as shown in FIG. 14, the lathe sectional shape forming unit 222 forms the shape, which subtracts the solid model of the shape including the part shape lathe stored in the lathe shape storage unit 221 from the material shape stored in the material shape storage unit 211 by a differential calculation, as the solid model of the lathe shape performing the lathe (step S501).

Next, the X-Z plane is formed so that $X \geq 0.0$ and $Y=0.0$ (step S502).

FIG. 15(a) is a diagram that shows an example of the X-Z plane that includes shape including the part shape lathe and $X \geq 0.0$ and $Y=0.0$.

Next, the sheet as a result of the multiplication calculation of the shape including the part shape lathe and the X-Z plane is set to the sheet model of the lathe sectional shape, and is stored in the lathe sectional shape storage unit 223 (step S503). Hereinafter, the solid model of the lathe sectional shape is called a lathe sectional shape.

FIG. 15(b) is a diagram that shows an example of the lathe sectional shape.

Figure 16:
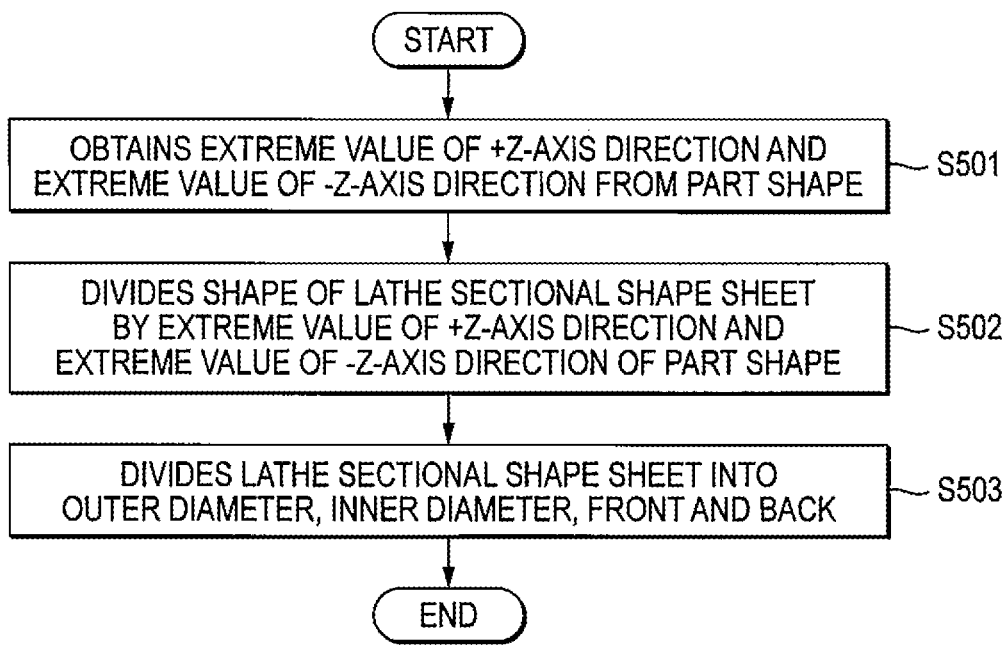
FIG. 16 is a flow chart for describing the operation of a front, back, outer diameter, and inner diameter shape dividing unit according to embodiment 1 of the present invention.
Figure 17:
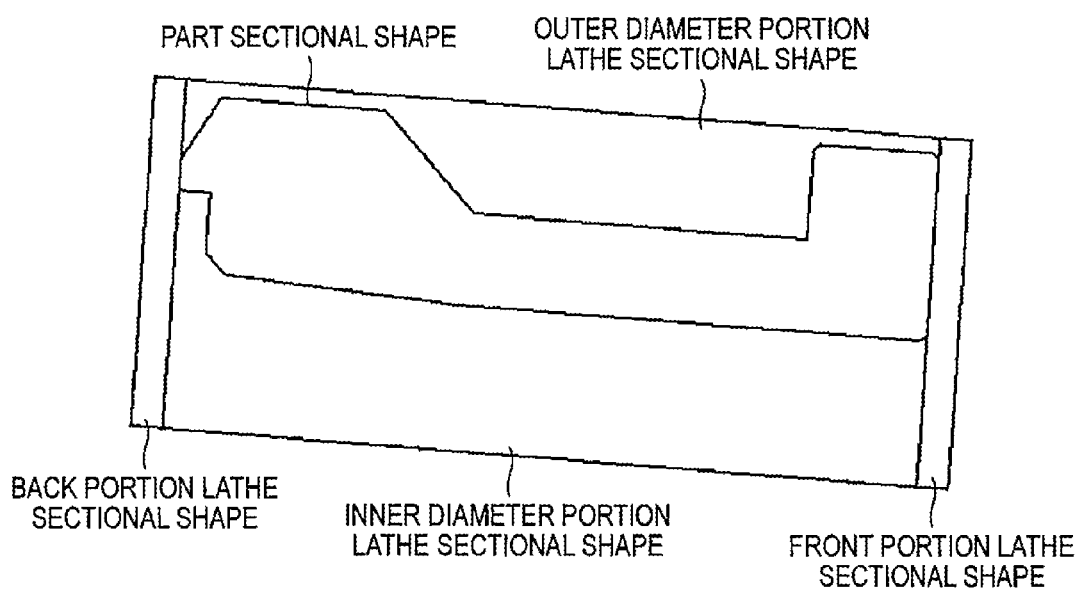
FIG. 17 is a diagram for providing a supplementary explanation of the operation of a front, back, outer diameter, and inner diameter shape dividing unit according to embodiment 1 of the present invention.

Next, when the lathe sectional shape is stored in the lathe sectional shape storage unit 223, as shown in FIGS. 16 and 17, the front, back, outer diameter, and inner diameter dividing unit 224 divides the lathe sectional shape into the front portion lathe sectional shape, the back portion lathe sectional shape, the outer diameter lathe sectional shape, and the inner diameter lathe sectional shape.

That is, as shown in FIG. 16, the front, back, outer diameter, and inner diameter dividing unit 224 obtains an extreme value of the +Z-axis direction and an extreme value of the −Z-axis direction from the part shape stored in the part shape storage unit 207 by the geometric analysis (step S5001).

Next, the lathe sectional shape stored in the lathe sectional shape storage unit 223 is divided by a straight line parallel to the X-axis so as to form the extreme value of the +Z direction as the boundary. In addition, the shape division is performed, for example, by embedding a straight line parallel to the X-axis in the extreme value of the +Z-axis direction into the sectional shape.

Next, the lathe sectional shape stored in the lathe sectional shape storage unit 223 is divided by the straight line parallel to the X-axis so as to form the extreme value of the −Z-axis direction as the boundary (step S5002). In addition, the shape division is performed, for example, by embedding a straight line parallel to the X-axis in the extreme value of the −Z-axis direction into the sectional shape.

Next, by the divided shape is divided by the position so that the shape situated at the −Z side from the −Z-axis direction extreme value is the front, the shape situated at the +Z side from the +Z-axis direction is the back, and among the shapes that are between the +Z-axis direction extreme value and the −Z-axis direction extreme value, when comparing the value by the X axis, the shape, where the value of the X-axis is situated in the large end of a range, is the outer diameter, and the shape, where the value of the X-axis is situated in the small place, is the inner diameter (step S5003).

Next, the divided lathe shape is stored in the front, back, outer diameter, and inner diameter shape storage unit 225.

FIG. 17 is a diagram that shows an example in which the lathe sectional shape is divided.

Next, when the divided lathe sectional shape is stored in the front, back, outer diameter, and inner diameter shape storage unit 225, as shown in FIGS. 18 to 30, the first/second step working sectional shape forming unit 227, the first step unnecessary shape deleting unit 229, and the second step unnecessary shape deleting unit 230 form the outer diameter portion first step working sectional shape, the outer diameter portion second step working sectional shape, the inner diameter portion first step working sectional shape, and the inner diameter portion second step working sectional shape.

Figure 18:
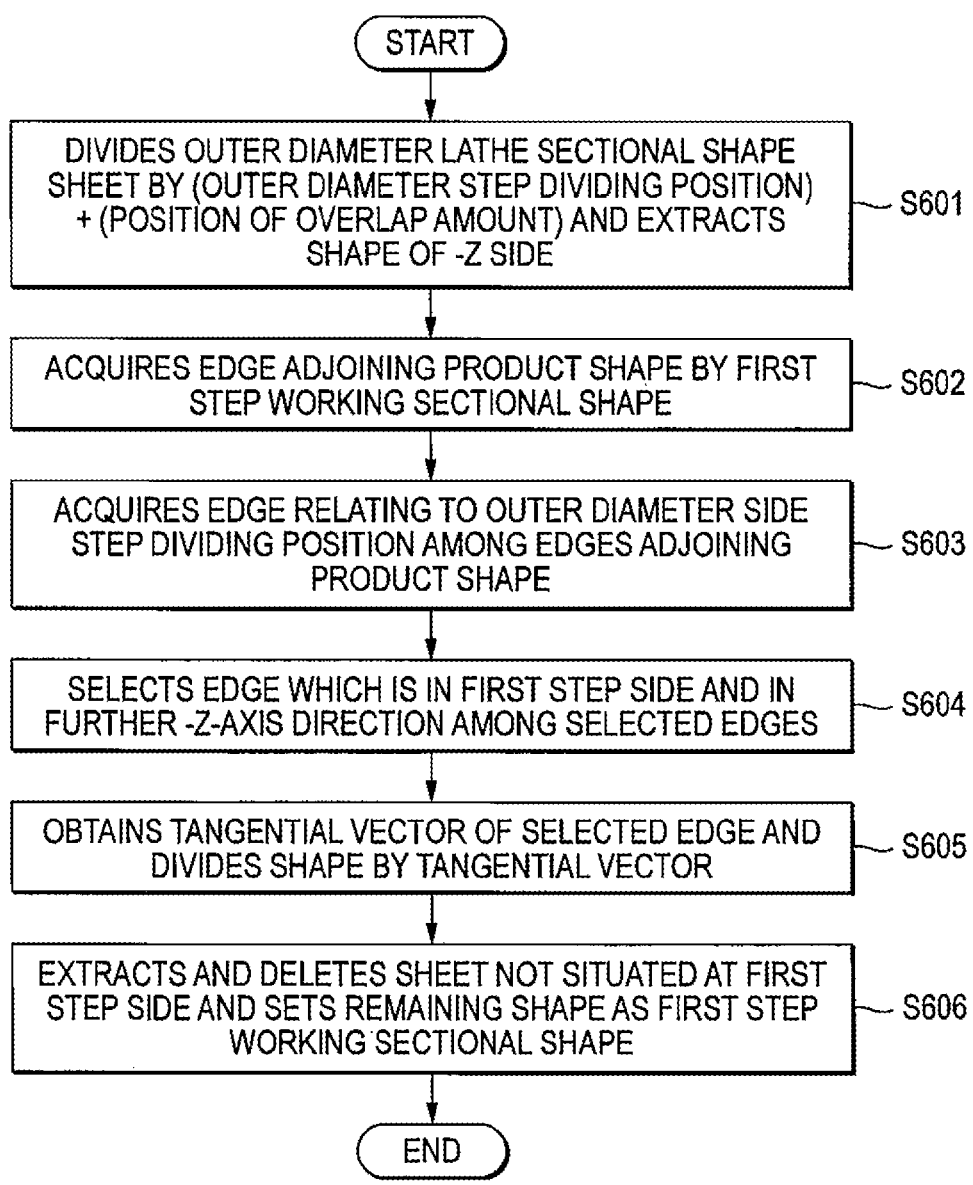
FIG. 18 is a flow chart for describing the operation of a first/second step working sectional shape forming unit and a first step unnecessary shape deleting unit according to embodiment 1 of the present invention.
Figure 19:
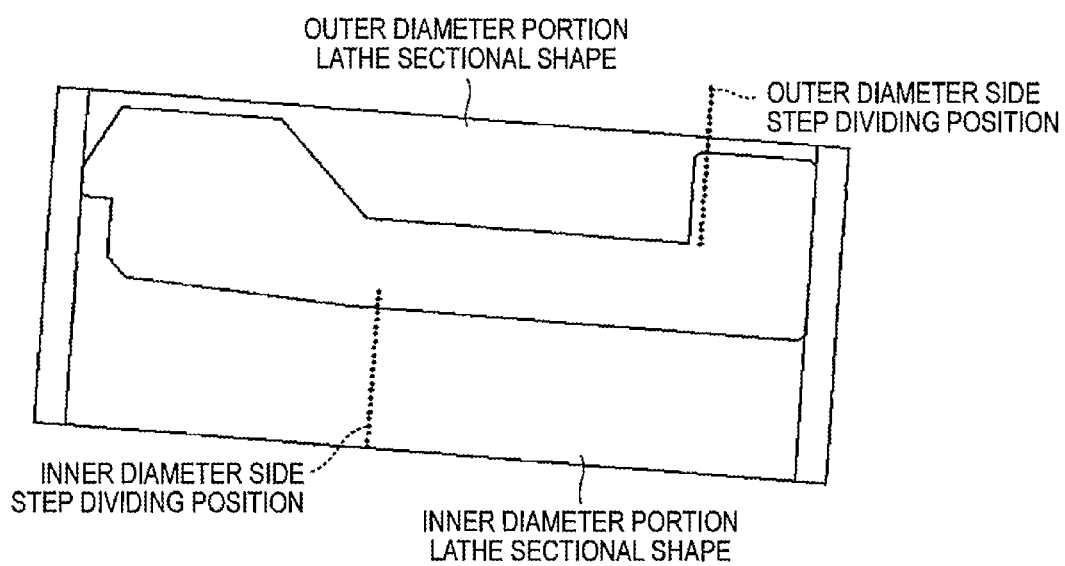
FIG. 19 is a diagram that shows an example of an outer diameter portion lathe sectional shape, an outer diameter side step dividing position, an inner diameter portion lathe sectional shape, and an inner diameter side step dividing position according to embodiment 1 of the present invention.
Figure 20:
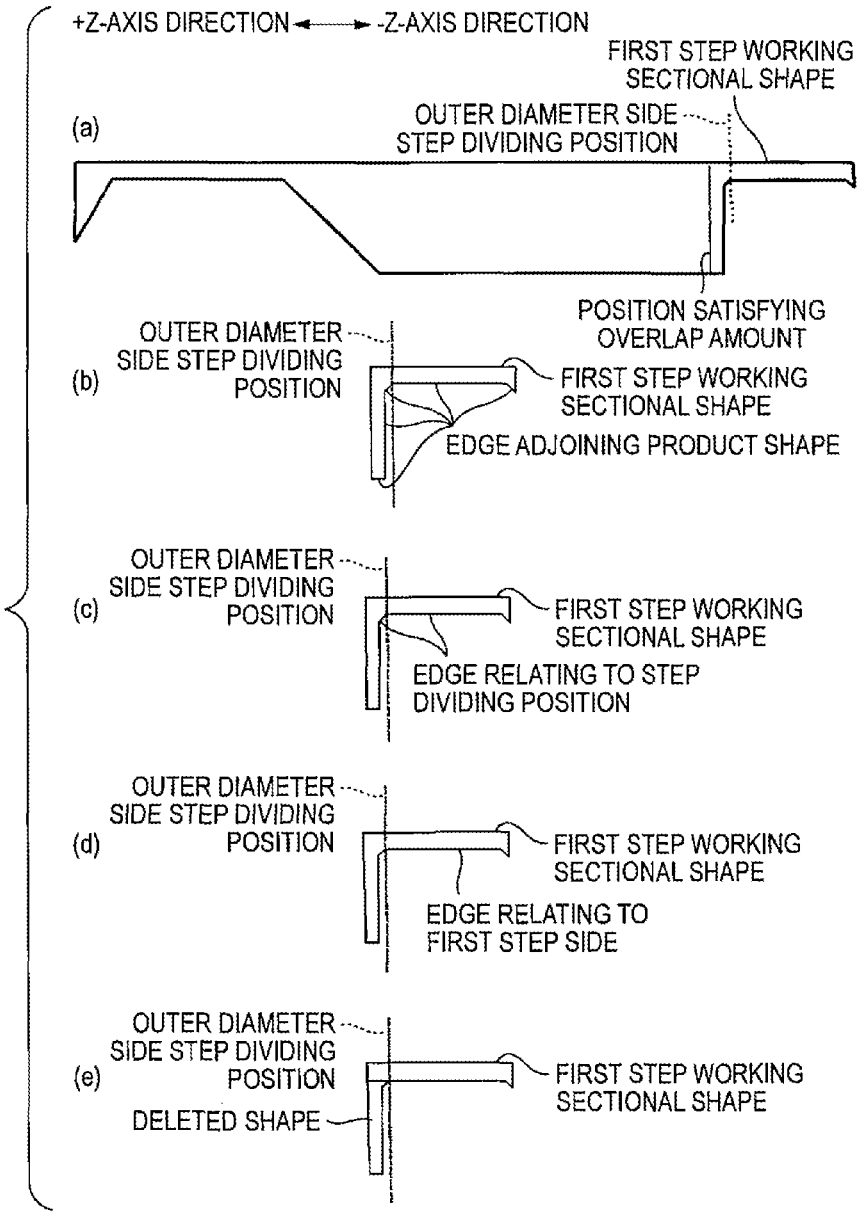
FIG. 20 is a diagram that shows the shape for providing a supplementary explanation of the operation of a first/second step working sectional shape forming unit and a first step unnecessary shape deleting unit according to embodiment 1 of the present invention.

Firstly, as shown in FIGS. 18 to 20, the first/second step working sectional shape forming unit 227 divides the outer diameter portion lathe sectional shape (the outer diameter portion sectional shape sheet) stored in the front, back, outer diameter, and inner diameter shape storage unit 225 by a position satisfying the overlap amount stored in the parameter storage unit 204 in the outer diameter side step dividing position stored in the step dividing position storage unit 217, and extracts the shape situated at the −Z-axis side from the dividing position as the provisional outer diameter portion first step working sectional shape (step S601). The division of the shape is performed, for example, by embedding a straight line parallel to the X-axis in the position satisfying the overlap amount in the outer diameter side step dividing position in the sectional shape. In addition, the overlap amount indicates an overlap amount of the first step and the second step so that uncut portion is not generated in the boundary between the first step and the second step, and is set based on the experience or the like of the user.

In addition, FIG. 19 is a diagram that shows an example of the outer diameter portion lathe sectional shape, the outer diameter side step dividing position, the inner diameter portion lathe sectional shape, and the inner diameter side step dividing position. FIG. 20(a) is a diagram that shows an example of the outer diameter portion lathe sectional shape divided in the position satisfying the overlap amount in the outer diameter side step dividing position.

Next, the first step unnecessary shape deleting unit 229 acquires an edge adjoining the product shape in the first step working sectional shape (step S602).

FIG. 20(b) is a diagram that shows an example of the edge adjoining the product shape in the first step working sectional shape.

Next, among the edge adjoining the product shape in the first step working sectional shape, an edge relating to the outer diameter side step dividing position is selected (step S603).

FIG. 20(c) is a diagram that shows an example of an edge relating to the outer diameter side step dividing position in the first step working sectional shape.

Next, among the selected edges, the edge is selected which is in the first step side and is further in the −Z-axis direction (step S604).

FIG. 20(d) is a diagram that shows an example of an edge which is in the first step side and is further in the −Z-axis direction.

Next, a tangential vector of the +Z-axis direction in the outer diameter portion step dividing position of the selected edge is obtained, and the shape is divided by the tangential vector. In addition, the shape division is performed, for example, by embedding a straight line parallel to the tangential vector from the end point of the selected edge with respect to the first step working sectional shape (step S605).

FIG. 20(e) is a diagram that shows an example in which the shape is divided by the tangential direction vector of the +Z-axis direction in the outer diameter portion step dividing position of the edge that is in the first step side.

Finally, among the shapes divided by the tangential vector, the sheet (the shape) not situated at the first step side is extracted and deleted (an approximately oblong rectangular shape situated in the +Z-axis direction from the outer diameter portion step dividing position and situated in the lower part from the dividing position is deleted), and the remaining shape is set as the outer diameter portion first step working sectional shape (step S606).

Figure 21:
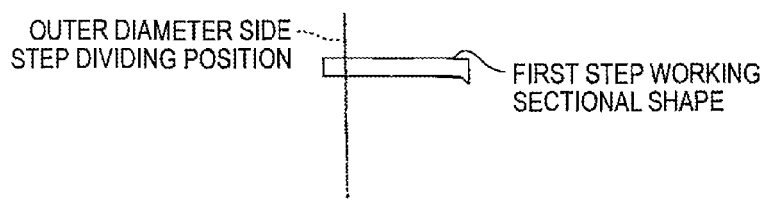
FIG. 21 is a diagram that shows an example of a first step working sectional shape of the outer diameter portion formed by the first/second step working sectional shape forming unit and the first step unnecessary shape deleting unit according to embodiment 1 of the present invention.

FIG. 21 is a diagram that shows an example of the first step working sectional shape of the extracted outer diameter portion.

Figure 22:
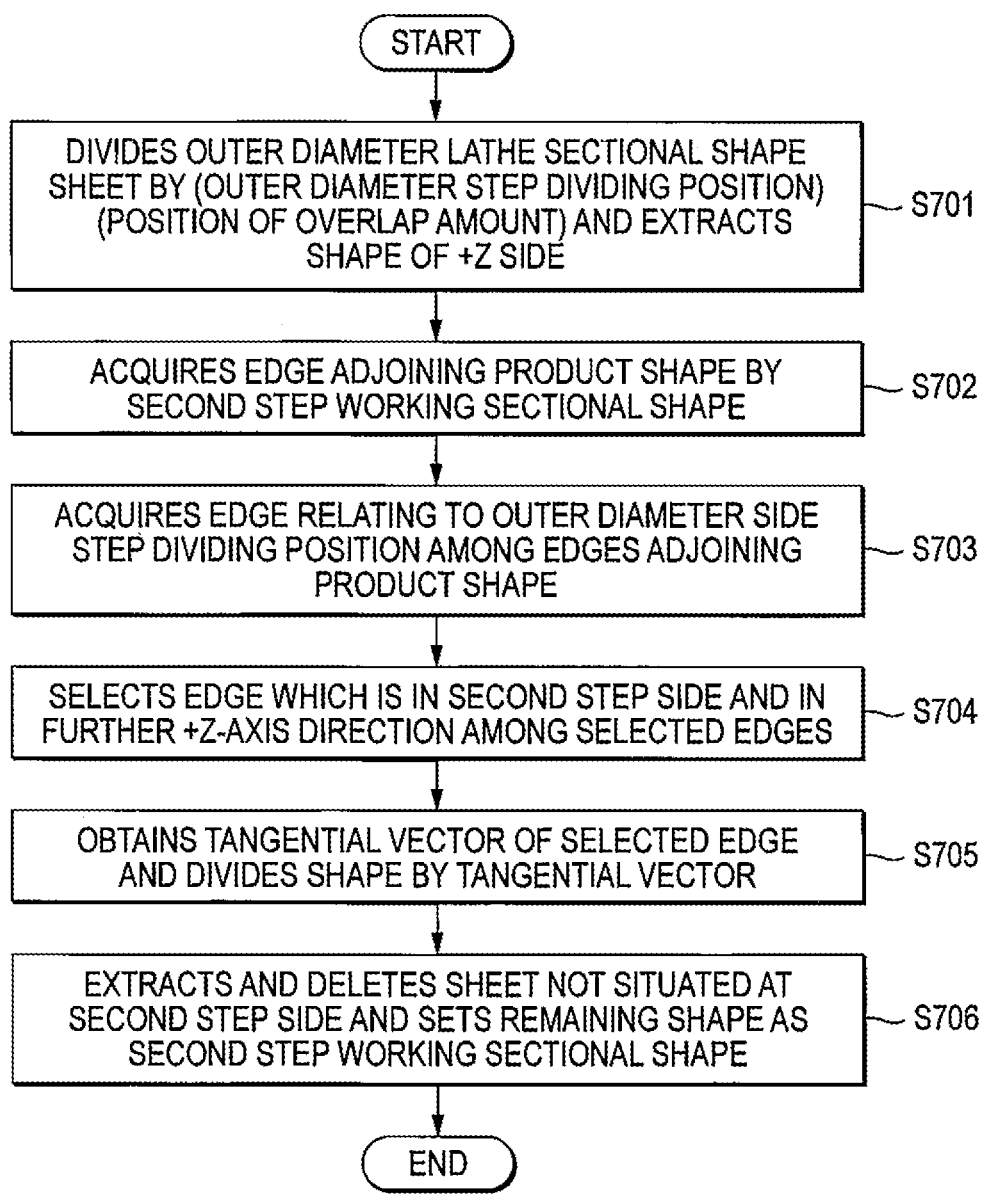
FIG. 22 is a flow chart for describing the operation of a first/second step working sectional shape forming unit and a second step unnecessary shape deleting unit according to embodiment 1 of the present invention.
Figure 23:
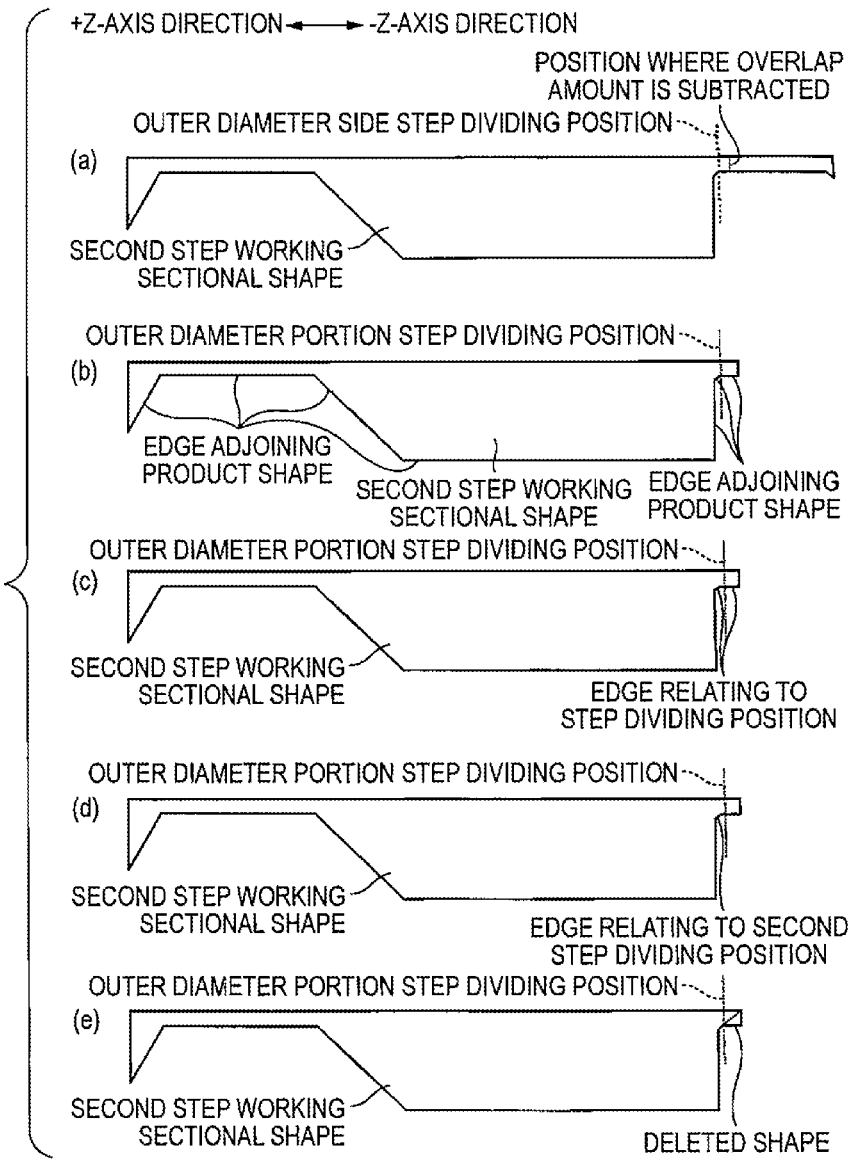
FIG. 23 is a diagram that shows the shape for providing a supplementary explanation of the operation of the first/second step working sectional shape forming unit and the second step unnecessary shape deleting unit according to embodiment 1 of the present invention.

Next, as shown in FIGS. 22 and 23, the first/second step working sectional shape forming unit 227 divides the outer diameter portion lathe sectional shape stored in the front, back, outer diameter, and inner diameter shape storage unit 225 by a position which subtracts the overlap amount stored in the parameter storage unit 204 from the outer diameter side step dividing position stored in the step dividing position storage unit 217, and extracts the shape situated at the +Z-axis side from the dividing position as the provisional outer diameter portion second step working sectional shape (step S701). Furthermore, the shape division is performed, for example, by embedding a straight line parallel to the X-axis in the position satisfying the outer diameter side step dividing position and the overlap amount in the sectional shape.

FIG. 23(a) is a diagram that shows an example of the divided outer diameter portion lathe sectional shape in the position where the overlap amount is subtracted from the outer diameter side step dividing position.

Next, the second step unnecessary shape deleting unit 230 acquires the edge adjoining the product shape in the second step working sectional shape (step S702).

FIG. 23(b) is a diagram that shows an example of an edge adjoining the product shape in the second step working sectional shape.

Next, among the edges adjoining the product shape in the second step working sectional shape, the edge relating to the outer diameter side step dividing position is selected (step S703).

FIG. 23(c) is a diagram that shows an example of an edge relating to the outer diameter side step dividing position in the second step working sectional shape.

Next, among the selected edges, the edge is selected which is in the second step side and is further in the +Z-axis direction (step S704).

FIG. 23(d) is a diagram that shows an example of an edge which is in the second step side and is further in the +Z-axis direction.

Next, a tangential vector of the −Z-axis direction in the outer diameter portion step dividing position of the selected edge is obtained, and the shape is divided by the tangential vector (step S705). In addition, the shape division is performed, for example, by embedding a straight line parallel to the tangential vector from the end point of the selected edge with respect to the second step working sectional shape.

FIG. 23(e) is a diagram that shows an example in which the shape is divided by the tangential direction vector of the −Z-axis direction in the outer diameter portion step dividing position of the edge that is in the second step side.

Finally, among the shapes divided by the tangential vector, the sheet (the shape) not situated at the second step side is extracted and deleted (a triangular shape situated in the −Z-axis direction from the outer diameter portion step dividing position and situated in the lower part from the dividing position is deleted), and the remaining shape is set as the outer diameter portion second step working sectional shape (step S706).

Figure 24:
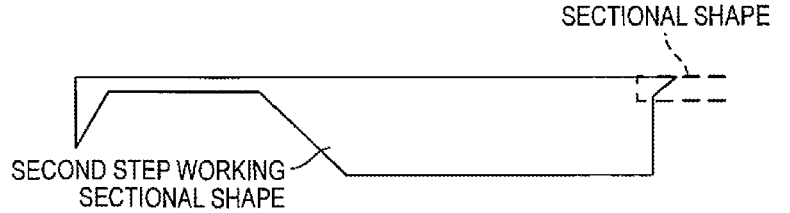
FIG. 24 is a diagram that shows an example of a second step working sectional shape of the outer diameter portion formed by the first/second step working sectional shape forming unit and the second step unnecessary shape deleting unit according to embodiment 1 of the present invention.

FIG. 24 is a diagram that shows an example of the second step working sectional shape of the extracted outer diameter portion.

As a result, in the grinding of the outer diameter portion, as shown in FIGS. 20(e) and 21, in the first step, the location (the oblong rectangular location) to be lathe in the second step may not be lathe. Furthermore, as shown in FIGS. 23(e) and 24, in the second step, since the location (the triangular shaped location) to be lathe in the second step is already lathe in the first step, the lathe of that location is unnecessary. In addition, since the first step and the second step are worked in an overlapping manner, uncut portion is not also generated.

Figure 25:
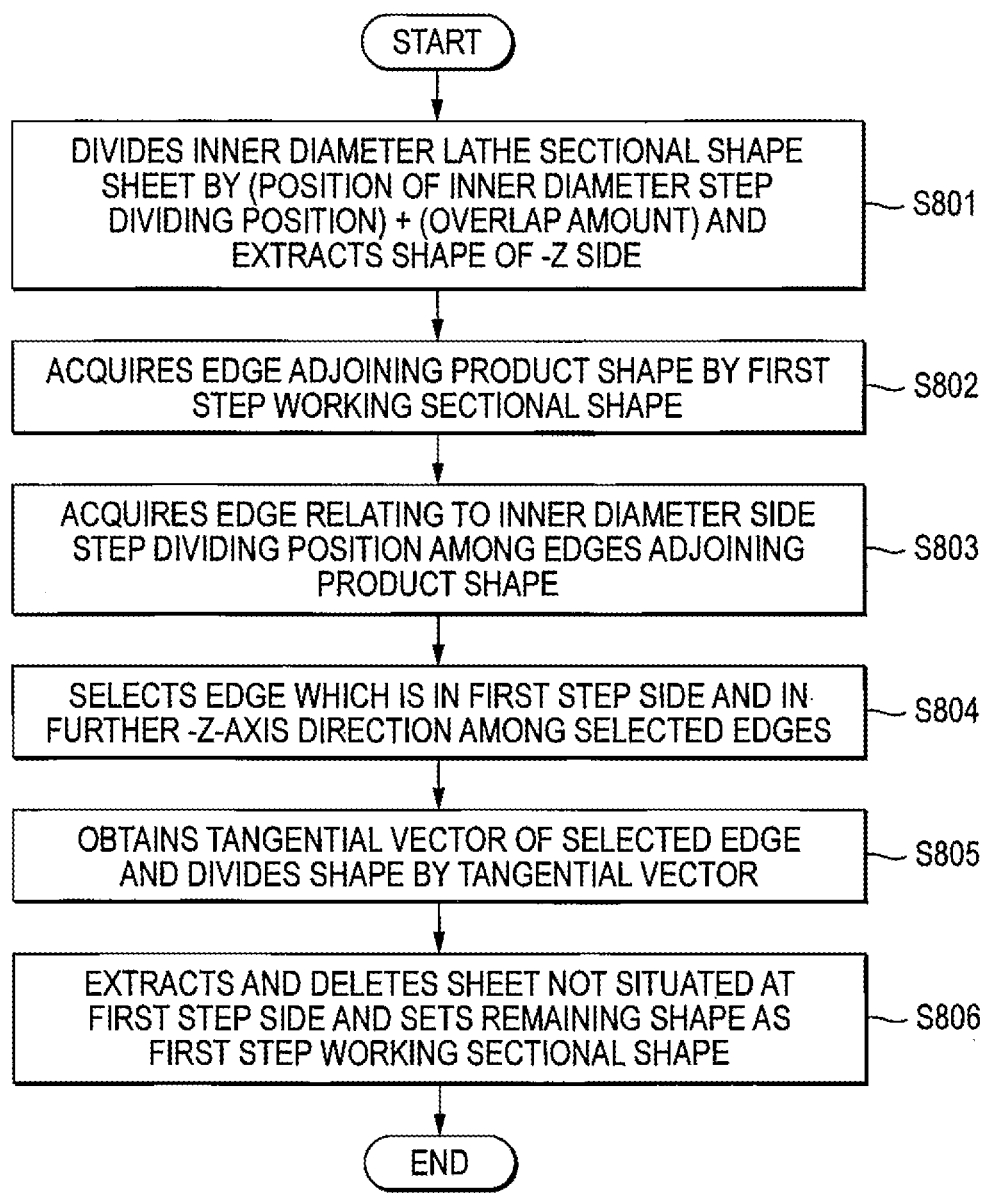
FIG. 25 is a flow chart for describing the operation of the first/second step working sectional shape forming unit and the first step unnecessary shape deleting unit according to embodiment 1 of the present invention.
Figure 26:
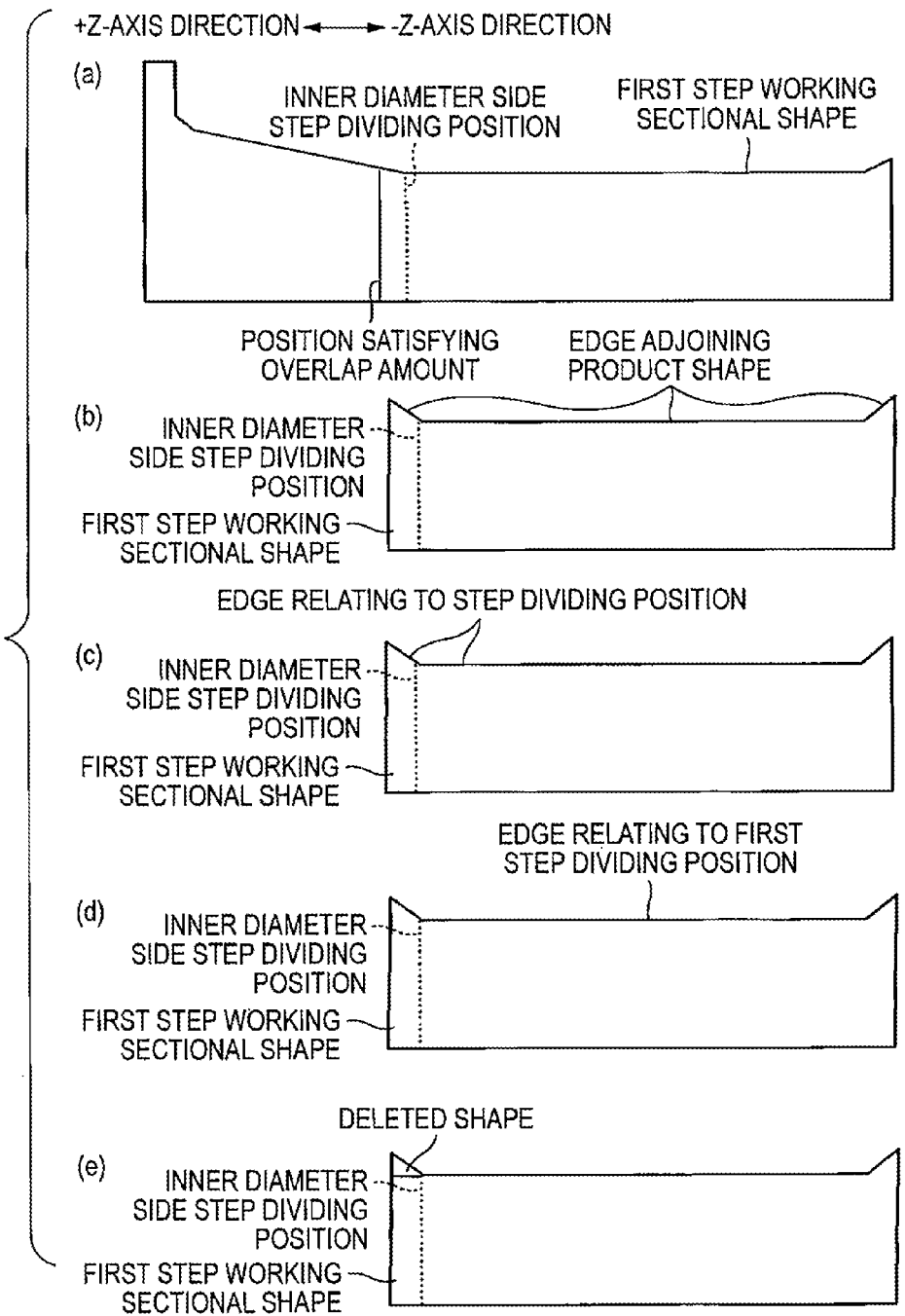
FIG. 26 is a diagram that shows the shape for providing a supplementary explanation of the operation of the first/second step working sectional shape forming unit and the first step unnecessary shape deleting unit according to embodiment 1 of the present invention.

Next, as shown in FIGS. 25 and 26, the first/second step working sectional shape forming unit 227 divides the inner diameter portion lathe sectional shape stored in the front, back, outer diameter, and inner diameter shape storage unit 225 by a position satisfying the overlap amount stored in the parameter storage unit 204 in the inner diameter side step dividing position stored in the step dividing position storage unit 217, and extracts the shape situated at the −Z-axis side by the dividing position as the provisional inner diameter portion first step working sectional shape (step S801). In addition, the shape division is performed, for example, by embedding a straight line parallel to the X-axis in the position satisfying the inner diameter side step dividing position and the overlap amount in the sectional shape.

FIG. 26(a) is a diagram that shows an example of the divided inner diameter portion lathe sectional shape in the position satisfying the overlap amount in the inner diameter side step dividing position.

Next, the first step unnecessary shape deleting unit 229 acquires the edge adjoining the product shape in the first step working sectional shape (step S802).

FIG. 26(b) is a diagram that shows an example of an edge adjoining the first step working sectional shape.

Next, among the edges adjoining the product shape in the first step working sectional shape, an edge relating to the inner diameter side step dividing position is selected (step S803).

FIG. 26(c) is a diagram that shows an example of an edge relating to the inner diameter side step dividing position in the first step working sectional shape.

Next, among the selected edges, the edge is selected which is in the first step side and is further in the −Z-axis direction (step S804).

FIG. 26(d) is a diagram that shows an example of an edge which is in the first step side and is further in the −Z-axis direction.

Next, a tangential vector of the +Z-axis direction in the inner diameter portion step dividing position of the selected edge is obtained, and the shape is divided by the tangential vector (step S805). In addition, the shape division is performed, for example, by embedding a straight line parallel to the tangential vector from the end point of the selected edge with respect to the first step working sectional shape.

FIG. 26(e) is a diagram that shows an example in which the shape is divided by the tangential direction vector of the +Z-axis direction in the inner diameter portion step dividing position of the edge that is in the first step side.

Finally, among the shapes divided by the tangential vector, the sheet (the shape) not situated at the first step side is extracted and deleted (a triangular shape situated in the +Z-axis direction from the inner diameter portion step dividing position and situated in the lower part from the dividing position is deleted), and the remaining shape is set as the inner diameter portion first step working sectional shape (step S806).

Figure 27:
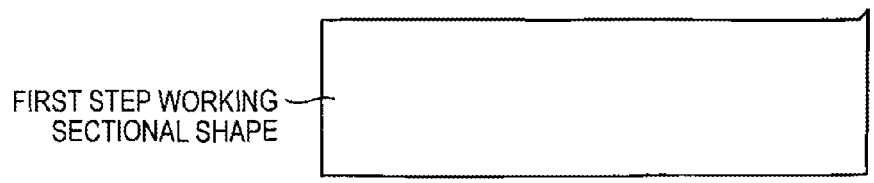
FIG. 27 is a diagram that shows an example of the first step working sectional shape of the inner diameter portion formed by the first/second step working sectional shape forming unit and the first step unnecessary shape deleting unit according to embodiment 1 of the present invention.

FIG. 27 is a diagram that shows an example of the first step working sectional shape of the extracted inner diameter portion.

Figure 28:
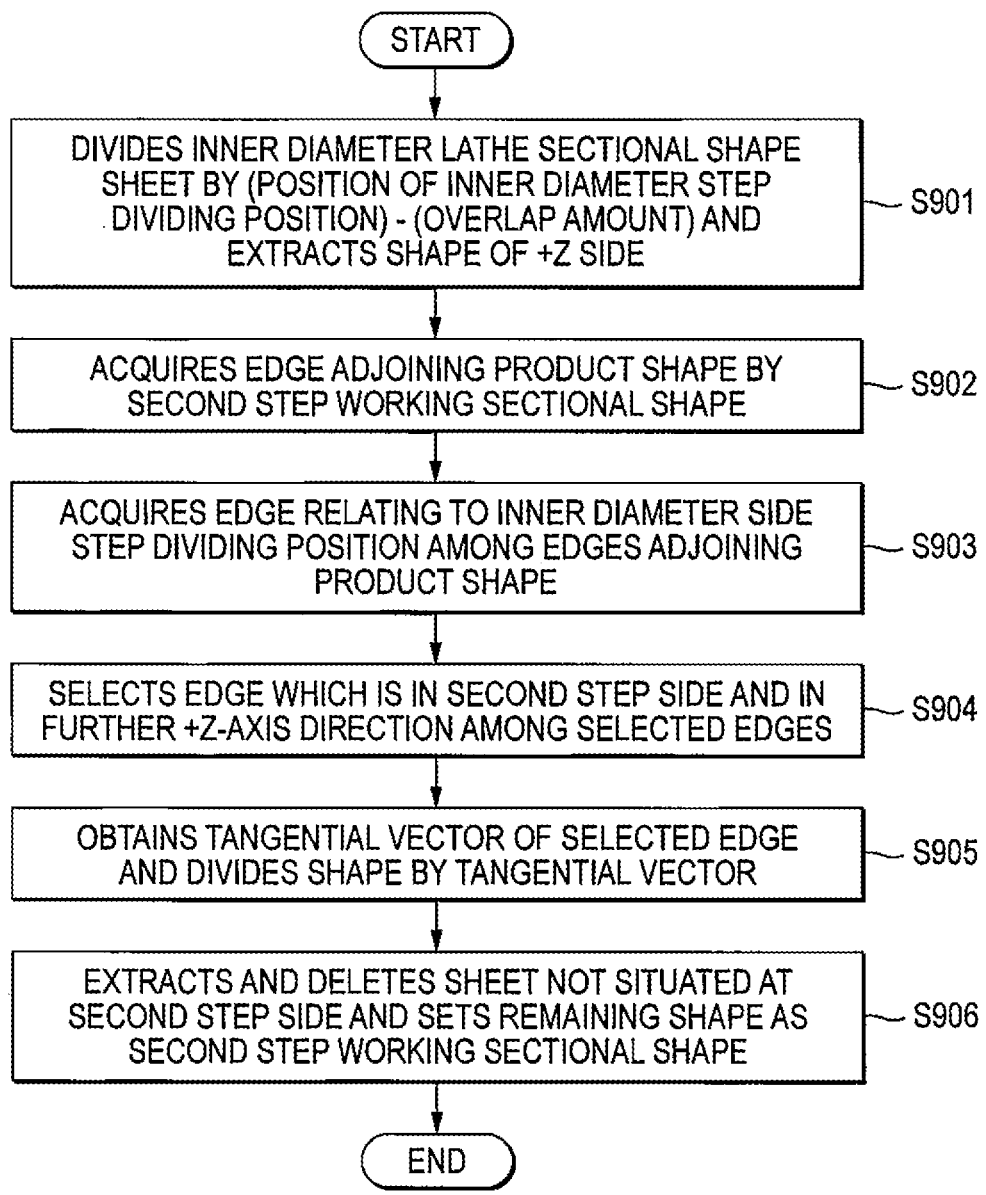
FIG. 28 is a flow chart for describing the operation of the first/second step working sectional shape forming unit and the second step unnecessary shape deleting unit according to embodiment 1 of the present invention.
Figure 29:
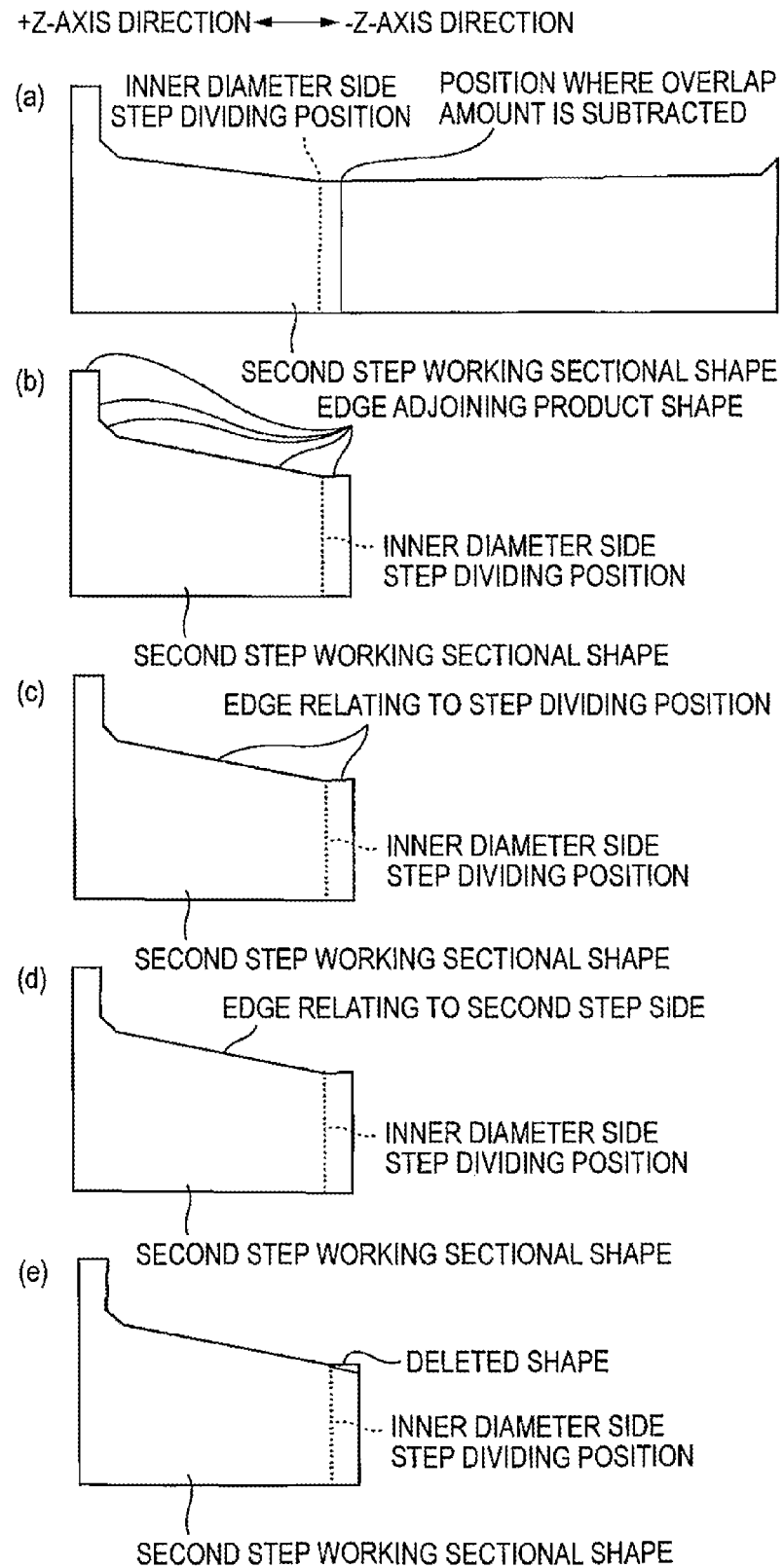
FIG. 29 is a diagram that shows the shape for providing a supplementary explanation of the operation of the first/second step working sectional shape forming unit and the second step unnecessary shape deleting unit according to embodiment 1 of the present invention.

Next, as shown in FIGS. 28 and 29, the first/second step working sectional shape forming unit 227 divides the inner diameter portion lathe sectional shape stored in the front, back, outer diameter, and inner diameter shape storage unit 225 by a position which subtracts the overlap amount stored in the parameter storage unit 204 from the inner diameter side step dividing position stored in the step dividing position storage unit 217, and extracts the shape situated at the +Z-axis side from the dividing position as the provisional inner diameter portion second step working sectional shape (step S901). Furthermore, the shape division is performed, for example, by embedding a straight line parallel to the X-axis in the position satisfying the inner diameter side step dividing position and the overlap amount in the sectional shape.

FIG. 29(a) is a diagram that shows an example of the divided inner diameter portion working sectional shape in the position where the overlap amount is subtracted from the inner diameter side step dividing position.

Next, the second step unnecessary shape deleting unit 230 acquires the edge adjoining the product shape in the second step working sectional shape (step S902).

FIG. 29(*b*) is a diagram that shows an example of an edge adjoining the product shape in the second step working sectional shape.

Next, among the edges adjoining the product shape in the second step working sectional shape, the edge relating to the inner diameter side step dividing position is selected (step S903).

FIG. 29(*c*) is a diagram that shows an example of an edge relating to the inner diameter side step dividing position of the second step working sectional shape.

Next, among the selected edges, the edge is selected which is in the second step side and is further in the +Z-axis direction (step S904).

FIG. 29(*d*) is a diagram that shows an example of an edge which is in the second step side and is further in the +Z-axis direction.

Next, a tangential vector of the −Z-axis direction in the inner diameter portion step dividing position of the selected edge is obtained, and the shape is divided by the tangential vector (step S905). In addition, the shape division is performed, for example, by embedding a straight line parallel to the tangential vector from the end point of the selected edge with respect to the second step working sectional shape.

FIG. 29(*e*) is a diagram that shows an example in which the shape is divided by the tangential direction vector of the −Z-axis direction in the inner diameter portion step dividing position of the edge that is in the second step side.

Finally, among the shapes divided by the tangential vector, the sheet (the shape) not situated at the second step side is extracted and deleted (a triangular shape situated in the −Z-axis direction from the inner diameter portion step dividing position and situated in the upper part from the dividing position is deleted), and the remaining shape is set as the inner diameter portion second step working sectional shape (step S906).

Figure 30:
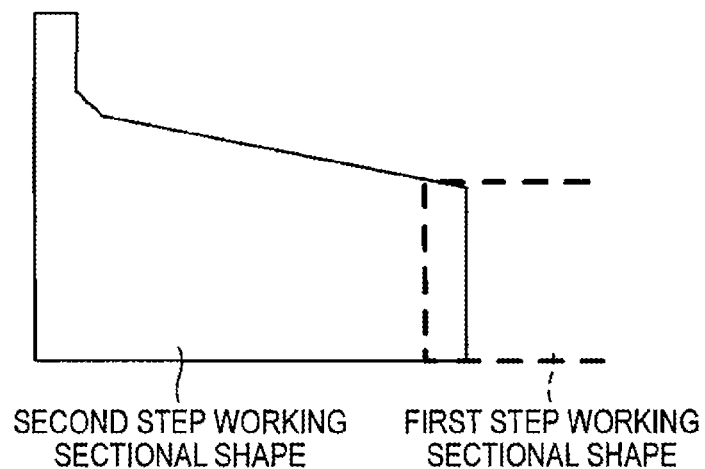
FIG. 30 is a diagram that shows an example of a second step working sectional shape of the inner diameter portion formed by the first/second step working sectional shape forming unit and the second step unnecessary shape deleting unit according to embodiment 1 of the present invention.

FIG. 30 is a diagram that shows an example of the second step working sectional shape of the extracted inner diameter portion.

In addition, the first and second step working sectional shapes of the extracted outer diameter portion and the first and second step working sectional shapes of the extracted inner diameter portion are stored in the first/second step working sectional shape storage unit 228.

As a result, in the grinding of the inner diameter portion, as shown in FIGS. 26(*e*) and 27, in the first step, the location (the triangular shaped location) to be lathe in the second step may not be lathe. Furthermore, as shown in FIGS. 29(*e*) and 30, in the second step, since the location (the triangular shaped location) to be lathe in the second step is already lathe in the first step, the lathe of that location is unnecessary. In addition, since the first step and the second step are worked in an overlapping manner, uncut portion is not also generated.

Next, by the lathe data forming unit 231, the lathe outer diameter working data of the first step is formed from the outer diameter portion first working sectional shape stored in the first/second step working sectional shape storage unit 228.

Next, the lathe drill data of the first step is formed from the inner diameter portion first working sectional shape stored in the first/second step working sectional shape storage unit 228 and the lathe drill diameter registered in the parameter storage unit 204, and the lathe inner diameter data of the first step is formed from the remaining portion cut by the lathe drill data.

Next, the lathe outer diameter working data of the second step is formed from the outer diameter portion second working sectional shape stored in the first/second step working sectional shape storage unit 228.

Next, the lathe drill data of the second step is formed from the inner diameter portion second working sectional shape stored in the first/second step working sectional shape storage unit 228 and the lathe drill diameter registered in the parameter storage unit 204, and the lathe inner diameter data of the second step is formed from the remaining portion cut by the lathe drill data.

Furthermore, the front portion lathe working data of the first step is formed from the front portion lathe sectional shape stored in the front, back, outer diameter, and inner diameter shape storage unit 225. Next, the back portion lathe working data of the second step is formed from the back portion lathe sectional shape stored in the front, back, outer diameter, and inner diameter shape storage unit 225. Moreover, the formed data is stored in the lathe data storage unit 232.

Figure 31:
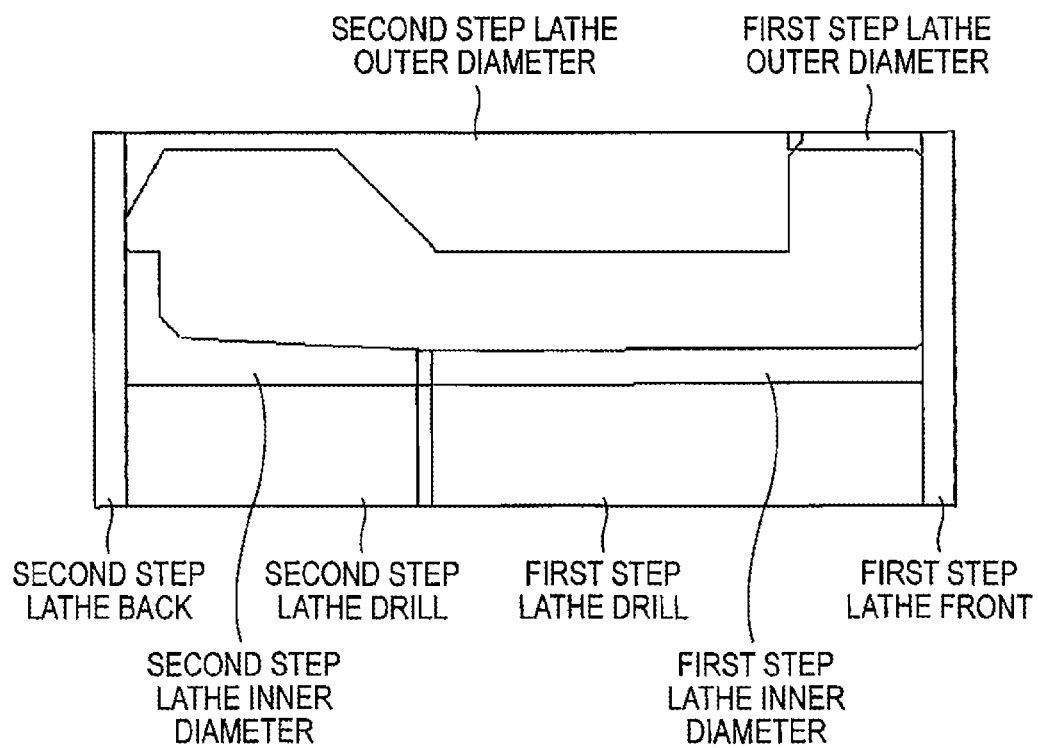
FIG. 31 is a diagram for describing the operation of a lathe data forming unit according to embodiment 1 of the present invention.

FIG. 31 is a diagram that shows an example of the formed lathe data.

Furthermore, by rotating the shape from the lathe data stored in the lathe data storage unit 232 by 360°, the solid model of the lathe shape is formed by the milling data forming unit 233, and the milling shape subtracted by the differential calculation from the working shape stored in the working shape storage unit 219 is formed.

Figure 32:
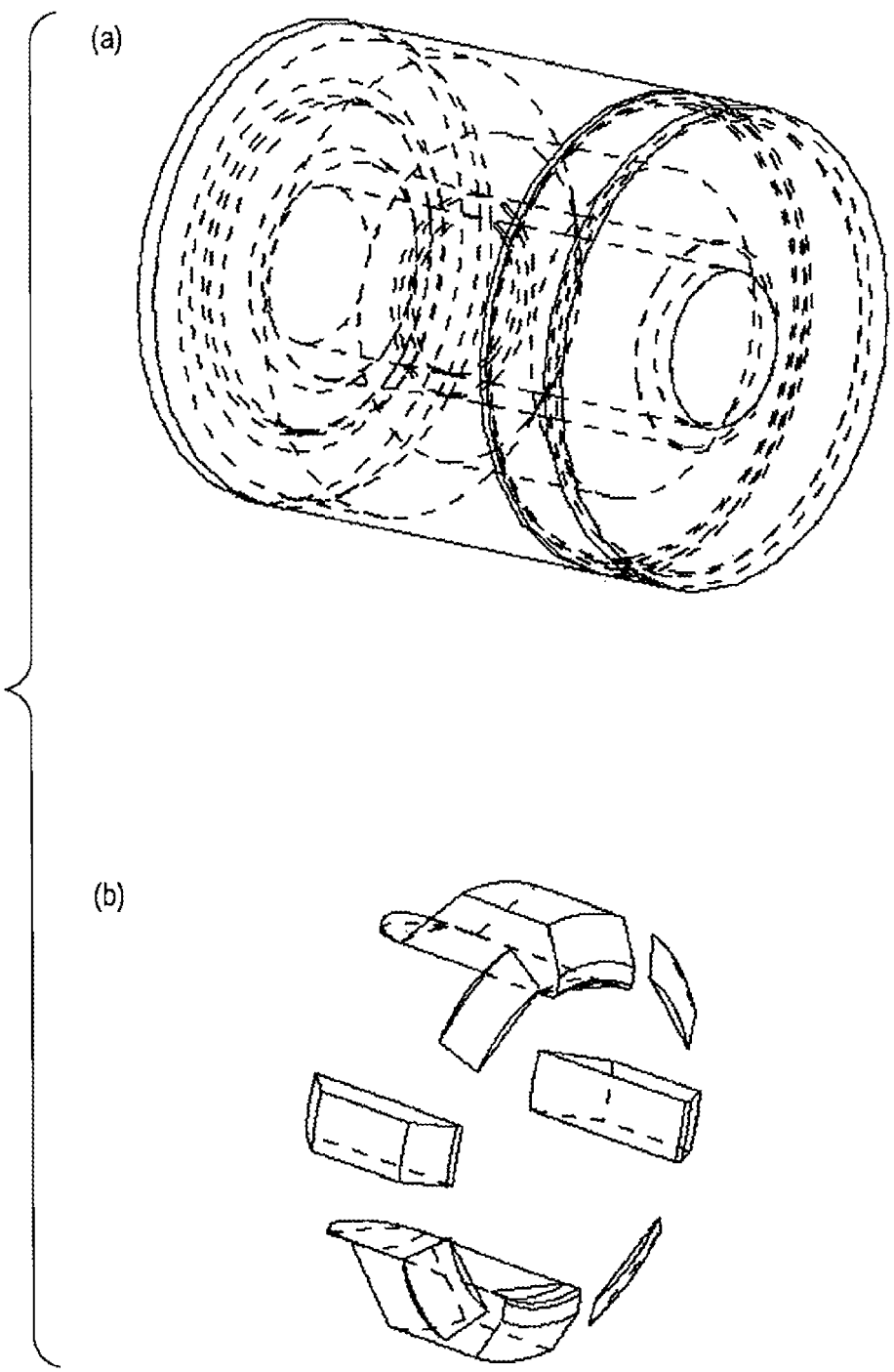
FIG. 32 is a diagram for describing the operation of a milling data forming unit according to embodiment 1 of the present invention.

FIG. 32(*a*) is an example of the solid model of the lathe shape formed by rotating the shape from the lathe data by 360°, and FIG. 32(*b*) is a diagram that shows an example of the shape in which the solid model of the lathe shape is subtracted from the working shape by the differential calculation.

Next, plane working data is formed as a direction becoming a bottom surface when working the plane adjoining the product shape from the milling shape by the milling tool. Next, punching data is formed which performs the punching from the part shape stored in the part shape storage unit 207. Moreover, the formed data is stored in the milling data storage unit 234.

Finally, by the working program forming unit 235, from the lathe data stored in the lathe data storage unit 232 and the milling data stored in the milling data storage unit 234, the working program for performing the working of the first step and the working program for performing the working performing the second step are sequentially aligned and are formed as one working program. Moreover, the formed working program is stored in the working program storage unit 236.

In addition, as is well known, the working program includes the shape information and the position information (the sequence data) of the material, the working method of the working unit, the working condition information, the tool information, the working shape information (the sequence data) or the like.

As mentioned above, according to embodiment 1, in consideration of the characteristics of the lathe sectional shape, from the lathe sectional shape formed by the lathe sectional shape forming mean, it is possible to form the working program which performs the working so that uncut portion is not generated in the boundary portion between the first step and the second step. In addition, even when the overlapping is performed so that uncut portion is not generated in the boundary portion between the first step and the second step, by deleting the location (for example, the location described in FIGS. 20 and 21) worked without uncut portion in the other step, the working location can be greatly reduced, the small cutting amount is sufficient for each step, whereby it is possible to form the less useless (the working time is short) working program.

Embodiment 2

Figure 33:
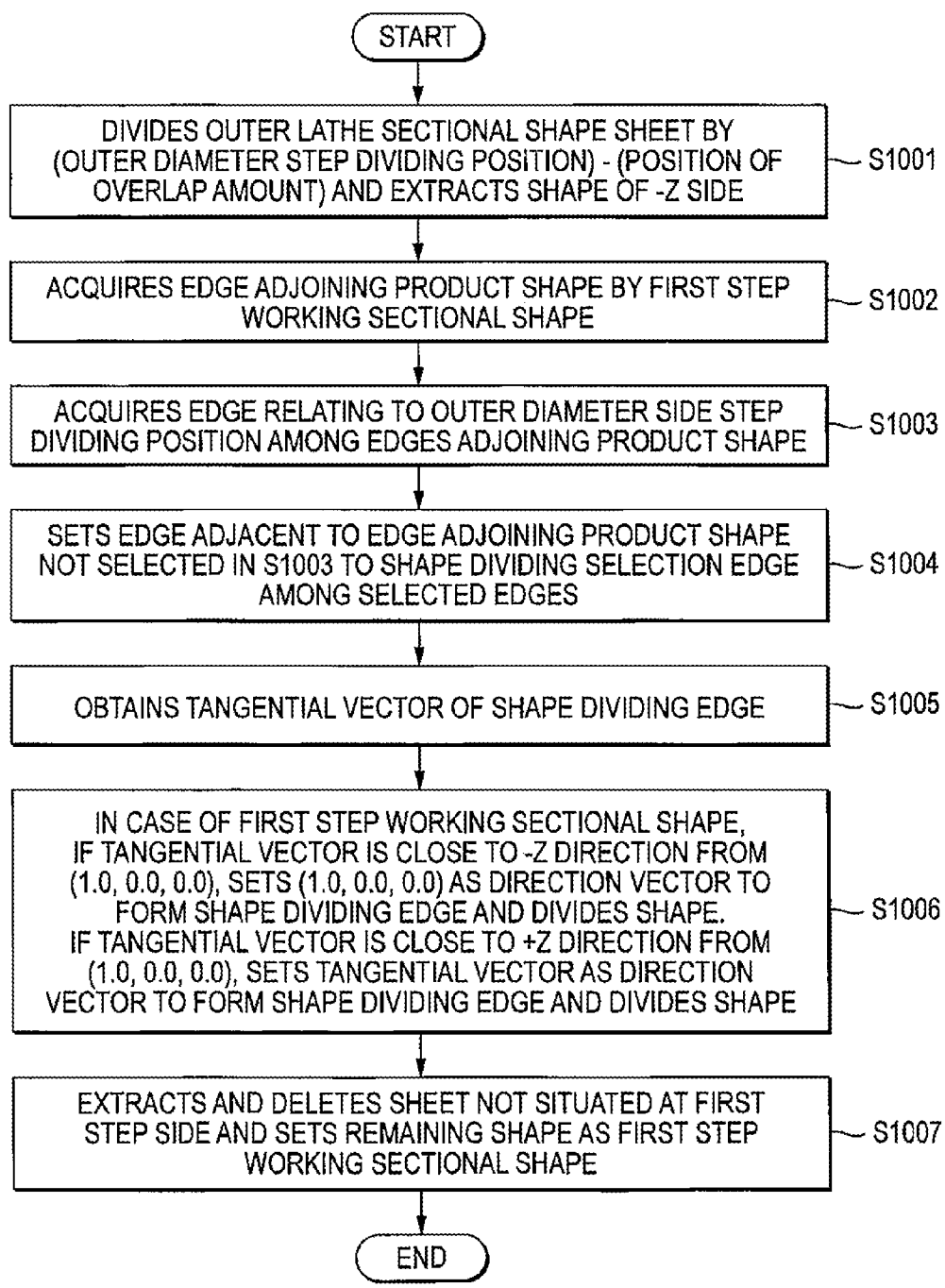
FIG. 33 is a flow chart for describing the operation of a first/second step working sectional shape forming unit and a first step unnecessary shape deleting unit according to embodiment 2 of the present invention.
Figure 34:
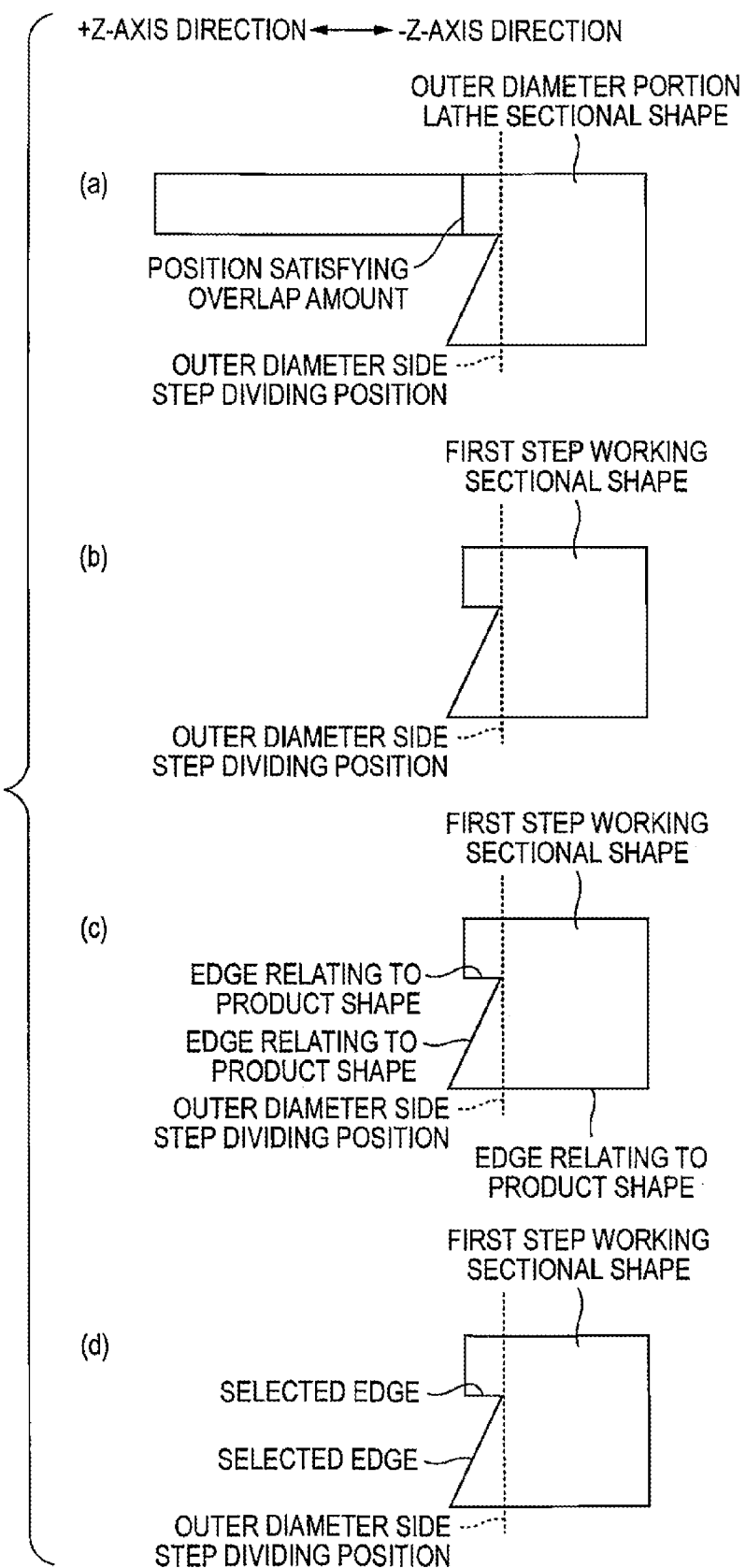
FIG. 34 is a diagram that shows the shape for providing a supplementary explanation of the operation of the first/second step working sectional shape forming unit and the first step unnecessary shape deleting unit according to embodiment 2 of the present invention.
Figure 35:
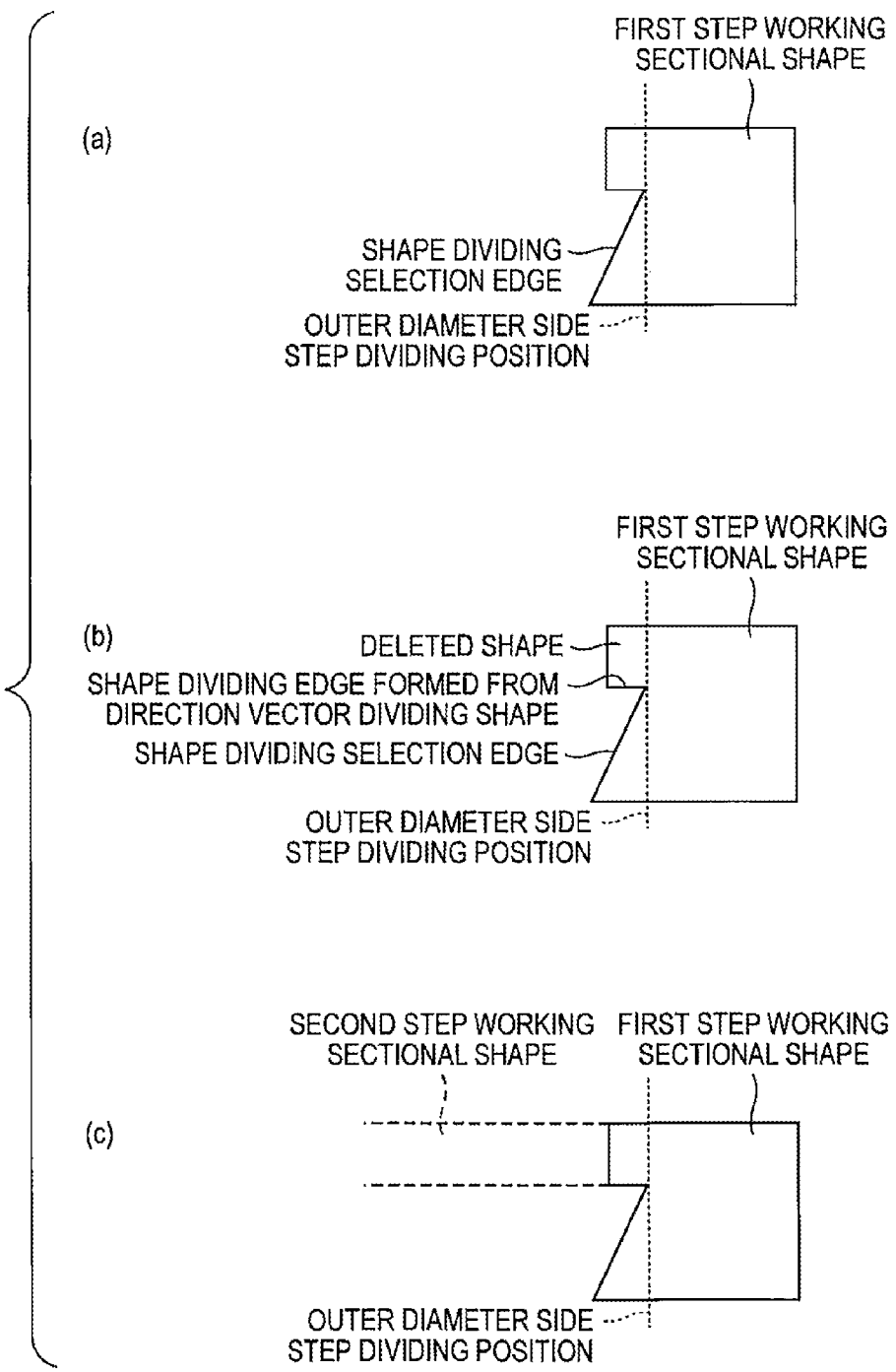
FIG. 35 is a diagram that shows the shape for providing a supplementary explanation of the operation of the first/second step working sectional shape forming unit and the first step unnecessary shape deleting unit according to embodiment 2 of the present invention.

Furthermore, for example, when the tangential vector of the edge relating to the step division as in FIG. 34(a) is from +Z-axis direction from (1, 0, 0), as shown in FIGS. 33, 34, and 35, the first/second step working shape forming unit 227, the first step unnecessary shape deleting unit 229, and the second step unnecessary shape deleting unit 230 form the outer diameter portion first step working sectional shape.

That is, as shown in the drawings, the first/second step working sectional shape forming unit 227 divides the outer diameter portion lathe sectional shape stored in the front, back, outer diameter, and inner diameter shape storage unit 225 by a position satisfying the overlap amount stored in the parameter storage unit 204 in the outer diameter side step dividing position stored in the step dividing position storage unit 217, and extracts the shape situated at the −Z-axis side from the dividing position as the provisional first step working sectional shape (step S1001). The division of the shape is performed, for example, by embedding a straight line parallel to the X-axis in the position satisfying the overlap amount in the outer diameter side step dividing position in the sectional shape.

In addition, FIG. 34(a) is a diagram that shows an example of the outer diameter side step dividing position, and the position satisfying the overlap amount in the outer diameter side step dividing position. FIG. 34(b) is a diagram that shows an example of the first step working sectional shape in which the outer diameter portion working sectional shape is divided in the position satisfying the overlap amount in the outer diameter side step dividing position.

Next, the first step unnecessary shape deleting unit 229 acquires the edge adjoining the product shape in the first step working sectional shape (step S1002).

FIG. 34(c) is a diagram that shows an example of an edge adjoining the first step working sectional shape.

Next, among the edges adjoining the product shape in the first step working sectional shape, the edge relating to the outer diameter side step dividing position is selected (step S1003).

FIG. 34(d) is a diagram that shows an example of an edge relating to the outer diameter side step dividing position.

Next, among the selected edges, the edge adjacent to the edge adjoining the product shape not selected in the step S1003 is selected (step S1004).

FIG. 35(a) is a diagram that shows an example of the edge (the shape dividing selection edge) adjacent to the edge adjoining the product shape not selected in the step S1003 among the selected edges.

Next, the direction vector in the step dividing position end point of the shape dividing selection edge is obtained (step S1005).

Next, in the case of the first step working sectional shape, if the tangential vector is close to −Z direction from (1.0, 0.0, 0.0), the shape dividing edge is formed by setting (1.0, 0.0, 0.0) as the direction vector, and the shape is divided. If the tangential vector is close to +Z direction from (1.0, 0.0, 0.0), the shape dividing edge is formed by setting the tangential vector as the direction vector, and the shape is divided (step S1006).

FIG. 35(b) is a diagram that shows an example of the shape division.

Among the shapes divided by the tangential vector, the sheet (the shape) not situated at the first step side is extracted and deleted (a rectangular shape situated in the +Z-axis direction from the outer diameter portion step dividing position and situated in the left part from the dividing position is deleted), and the remaining shape is set as the outer diameter portion first step working sectional shape (step S1007).

FIG. 35(c) is a diagram that shows an example of the first step working sectional shape of the extracted outer diameter portion.

Figure 36:
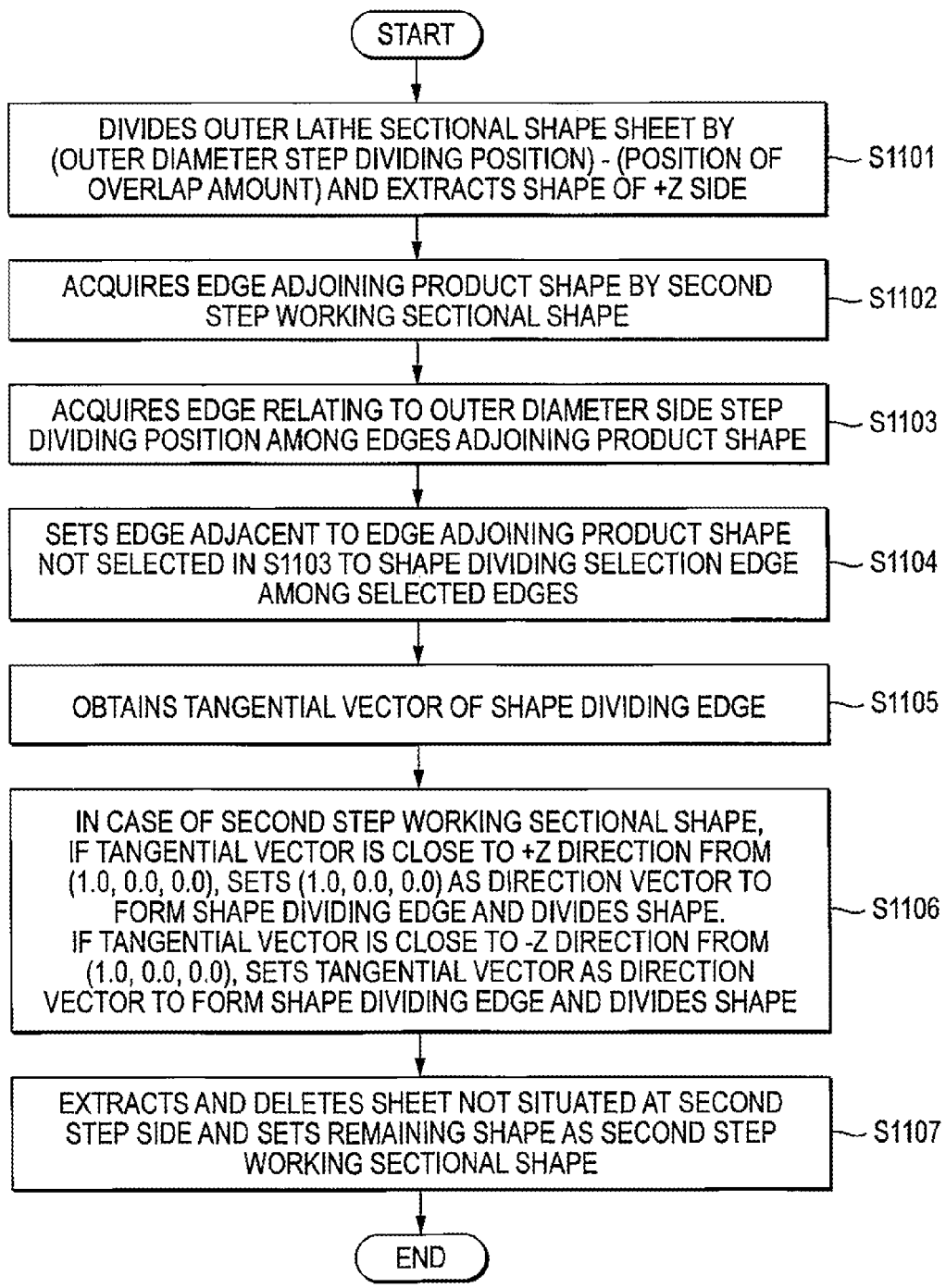
FIG. 36 is a flow chart for describing the operation of the first/second step working sectional shape forming unit and the second step unnecessary shape deleting unit according to embodiment 2 of the present invention.
Figure 37:
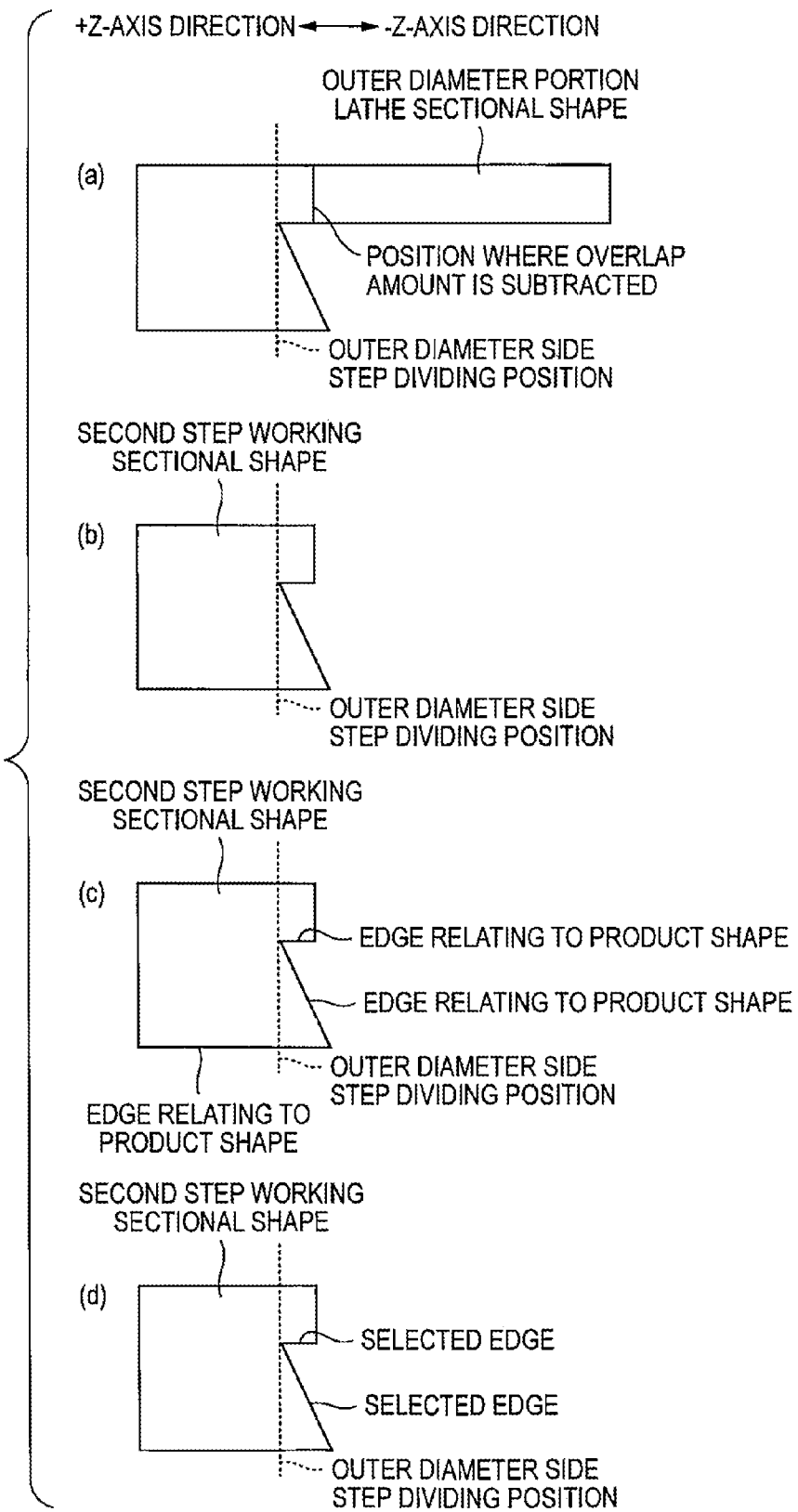
FIG. 37 is a diagram that shows the shape for providing a supplementary explanation of the operation of the first/second step working sectional shape forming unit and the second step unnecessary shape deleting unit according to embodiment 2 of the present invention.
Figure 38:
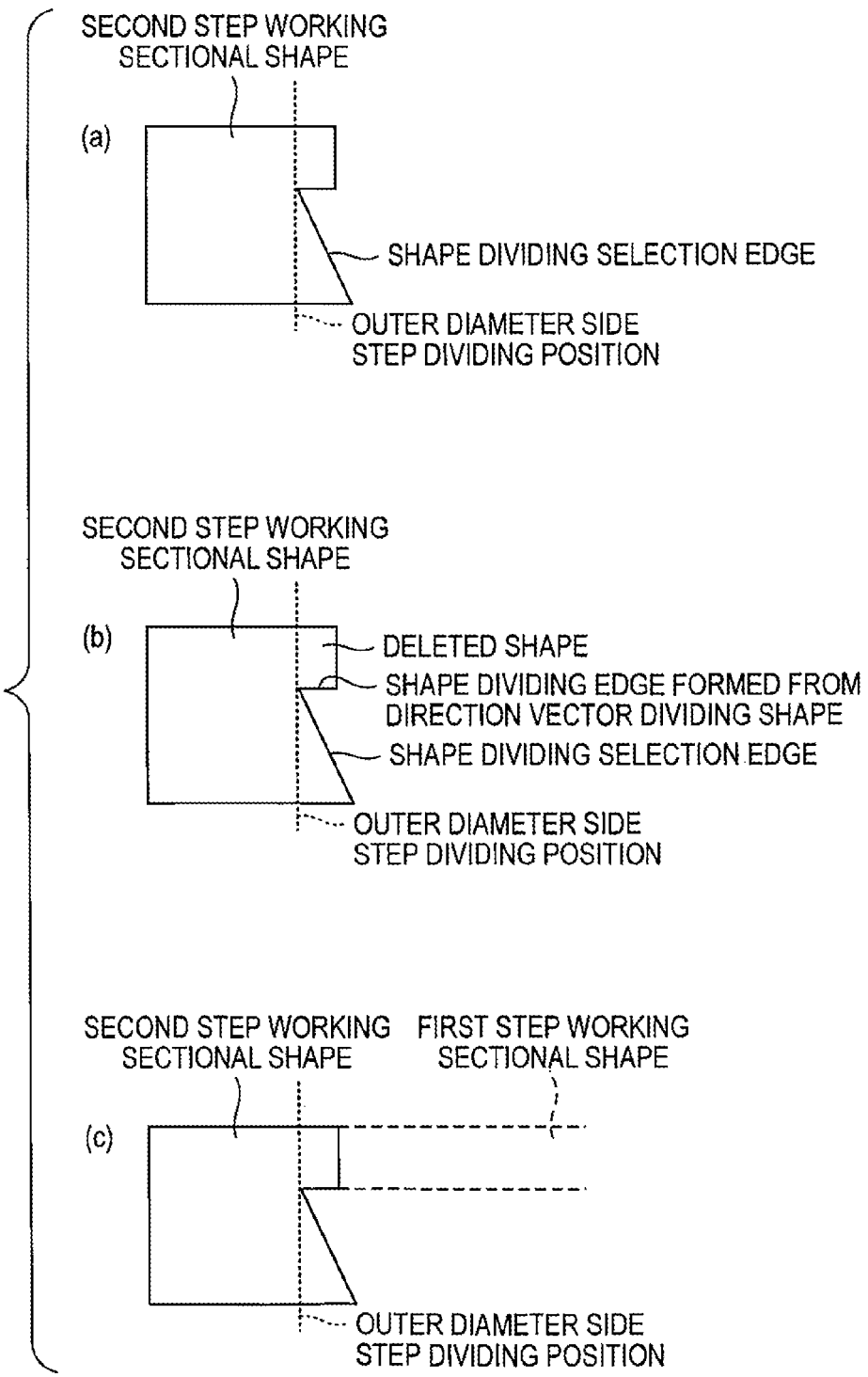
FIG. 38 is a diagram that shows the shape for providing a supplementary explanation of the operation of the first/second step working sectional shape forming unit and the second step unnecessary shape deleting unit according to embodiment 2 of the present invention.

Furthermore, for example, when the tangential vector of the edge relating to the step division as in FIG. 37(a) is from −Z-axis direction from (1, 0, 0), as shown in FIGS. 36 to 38, the first/second step working shape forming unit 227, the first step unnecessary shape deleting unit 229, and the second step unnecessary shape deleting unit 230 form the second step working sectional shape.

Firstly, the first/second step working sectional shape forming unit 227 divides the outer diameter portion lathe sectional shape stored in the front, back, outer diameter, and inner diameter shape storage unit 225 by a position where the overlap amount stored in the parameter storage unit 204 is subtracted from the outer diameter side step dividing position stored in the step dividing position storage unit 217, and extracts the shape situated at the +Z-axis side from the dividing position as the provisional second step working sectional shape (step S1101). The shape division is performed, for example, by embedding a straight line parallel to the X-axis in the position where the overlap amount is subtracted from the outer diameter side step dividing position in the sectional shape.

In addition, FIG. 37(a) is a diagram that shows an example of the outer diameter side step dividing position, and the position where the overlap amount is subtracted from the outer diameter side step dividing position. FIG. 37(b) is a diagram that shows an example of the second step working sectional shape in which the outer diameter portion working sectional shape is divided in the position where the overlap amount is subtracted from the outer diameter side step dividing position.

Next, the second step unnecessary shape deleting unit 230 acquires the edge adjoining the product shape in the second step working sectional shape (step S1102).

FIG. 37(c) is a diagram that shows an example of an edge adjoining the second step working sectional shape.

Next, among the edges adjoining the product shape in the second step working sectional shape, the edge relating to the outer diameter side step dividing position is selected (step S1103).

FIG. 37(d) is a diagram that shows an example of an edge relating to the outer diameter side step dividing position.

Next, among the selected edges, the edge adjacent to the edge adjoining the product shape not selected in the step S1103 is selected (step S1104).

FIG. 38(a) is a diagram that shows an example of the edge (the shape dividing selection edge) adjacent to the edge adjoining the product shape not selected in the step S1103 among the selected edges.

Next, the direction vector in the step dividing position end point of the shape dividing selection edge is obtained (step S1105).

Next, in the case of the second step working sectional shape, if the tangential vector is close to +Z direction from (1.0, 0.0, 0.0), the shape dividing edge is formed by setting (1.0, 0.0, 0.0) as the direction vector, and the shape is divided. If the tangential vector is close to −Z direction from (1.0, 0.0, 0.0), the shape dividing edge is formed by setting the tangential vector as the direction vector, and the shape is divided (step S1106).

FIG. 38(*b*) is a diagram that shows an example of the shape division.

Among the shapes divided by the tangential vector, the sheet (the shape) not situated at the second step side is extracted and deleted (a rectangular shape situated in the −Z-axis direction from the outer diameter portion step dividing position and situated in the right part from the dividing position is deleted), and the remaining shape is set as the outer diameter portion second step working sectional shape (step S1107).

FIG. 38(*c*) is a diagram that shows an example of the second step working sectional shape of the extracted outer diameter portion.

As mentioned above, according to embodiment 2, since the first/second step working shape can be formed from the lathe sectional shape formed by the lathe sectional shape forming mean in consideration of the characteristics of the lathe sectional shape, it is possible to form the working program which does not perform the overlap when there is no need for the overlap. In addition, whereby it is possible to form the working program which has no uncut portion and has little uselessness (the working time is shortened).

Embodiment 3

Figure 39:
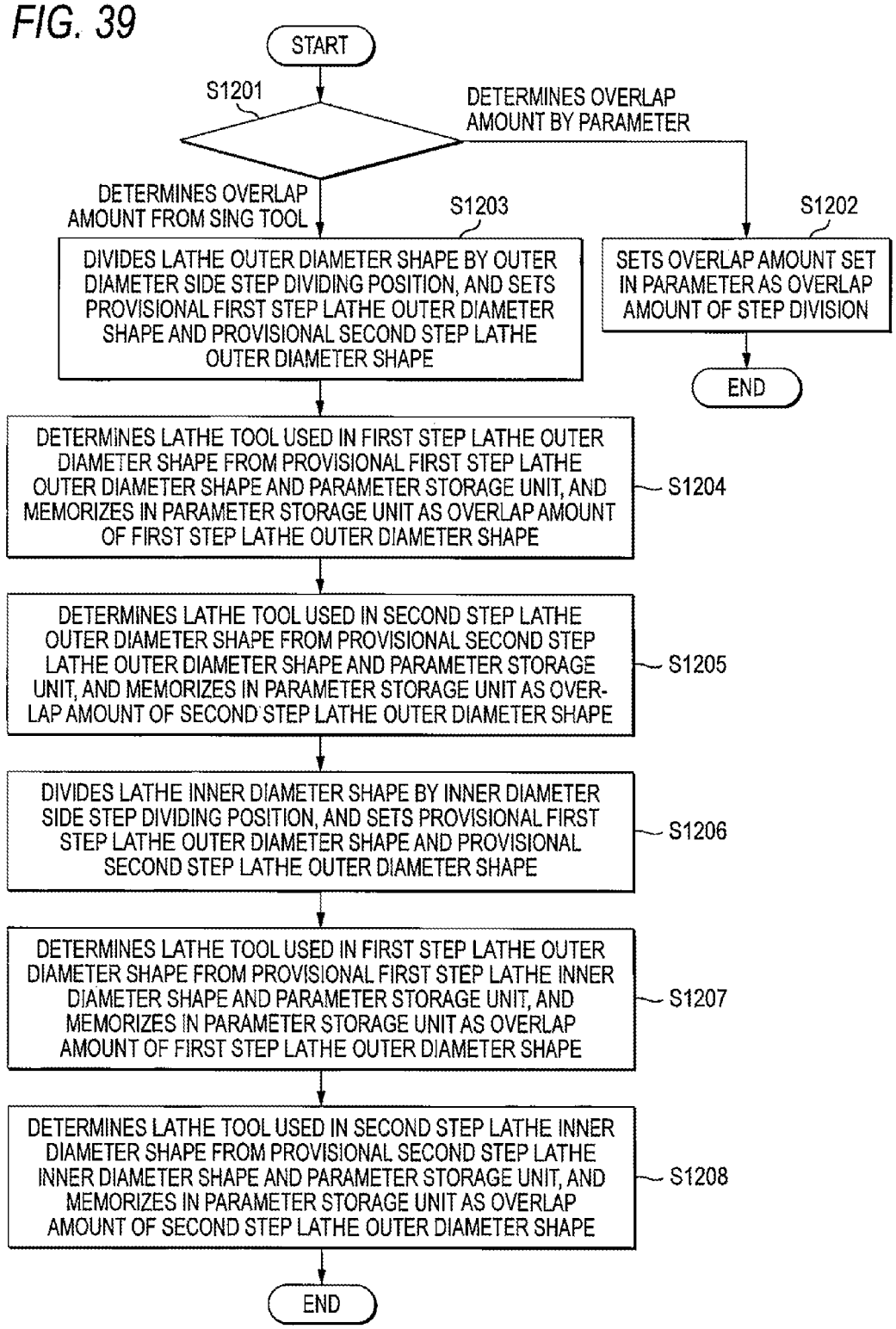
FIG. 39 is a flow chart for describing an overlap amount determining unit according to embodiment 3 of the present invention.
Figure 40:
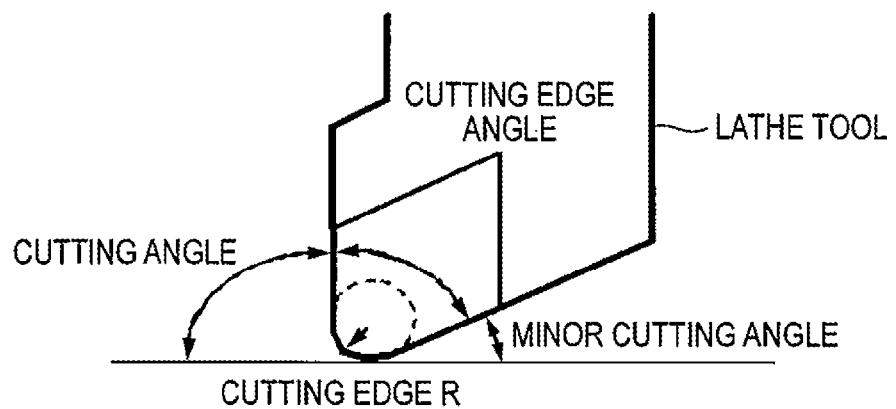
FIG. 40 is a diagram that shows an example of a tool for providing a supplementary explanation of the operation of the overlap amount determining unit according to embodiment 3 of the present invention.
Figure 41:
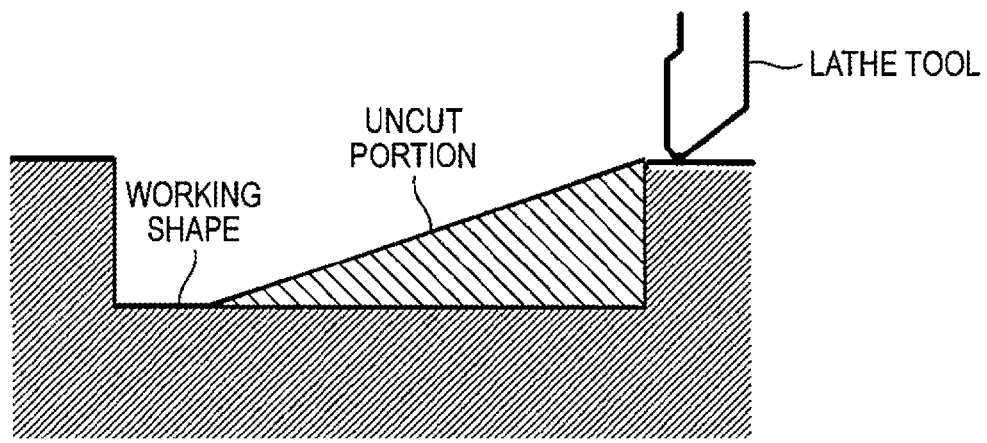
FIG. 41 is a diagram that shows an example of uncut portion for providing a supplementary explanation of the operation of the overlap amount determining unit according to embodiment 3 of the present invention.

In the embodiments mentioned above, although a case was described where the setting of the overlap amount is performed by a user through the parameter setting unit 203, as shown in FIGS. 39 to 41, the overlap amount determining unit 226 may be provided and the overlap amount may be automatically set by the overlap amount determining unit 226.

That is, FIG. 39 is a flow chart for describing the operation of the overlap amount determining unit 226. Hereinafter, the operation of the overlap amount determining unit 226 will be described based on FIG. 39.

Firstly, it is decided, whether the overlap amount is determined by the parameter or the overlap amount is determined from the tool used, by the overlap amount determining method (step S1201).

In the case of determining the overlap amount by the parameter, the overlap amount is determined from the parameter of the overlap amount stored in the parameter storage unit 204 (step S1202).

In the case of determining the overlap amount from the tool used, the lathe outer diameter shape is divided in the outer diameter side step dividing position stored in the step dividing position storage unit 217, the shape situated in −Z-axis side is set to the provisional first step lathe outer diameter shape, and the shape situated in +Z-axis side is set to the provisional second step lathe outer diameter shape (step S1203).

Next, from the tool information stored in the parameter storage unit 204, the working portion, which performs the working consistent with the material stored in the parameter storage unit 204, selects the tool of the first step. Next, the working portion analyzes the provisional first step lathe outer diameter shape, selects the tool of the cutting angle and the cutting edge angle with the minimum uncut portion, and memorizes the cutting edge R amount of the selected tool in the parameter storage unit 204 as the overlap amount of the first step lathe outer diameter shape (step S1204).

In addition, selecting the cutting angle and the cutting edge angle with the minimum uncut portion refers to as below. That is, in the case of performing the lathe by the cutting angle and the cutting edge angle as in FIG. 40, since the cutting can be performed over a minor cutting angle, uncut portion as in FIG. 41 is generated. For that reason, it refers that the tool of the working shape selects the tool with the minimum uncut portion from the combination of the cutting position or shape, the cutting angle of the tool, and the cutting edge angle.

Furthermore, the cutting edge R is R of a small roundness in the edge of the lathe as in FIG. 40, and uncut portion is generated by the cutting edge R.

Next, from the tool information stored in the parameter storage unit 204, the working portion, which performs the working consistent with the material stored in the parameter storage unit 204, selects the tool of the second step. Next, the working portion analyzes the provisional second step lathe outer diameter shape, selects the tool of the cutting angle and the cutting edge angle with the minimum uncut portion, and memorizes the cutting edge R amount of the selected tool in the parameter storage unit 204 as the overlap amount of the second step lathe outer diameter shape (step S1205).

Next, in the case of determining the overlap amount from the tool used, the lathe inner diameter shape is divided in the inner diameter side step dividing position stored in the step dividing position storage unit 217, the shape situated in −Z-axis side is set to the provisional first step lathe outer diameter shape, and the shape situated in +Z-axis side is set to the provisional second step lathe inner diameter shape (step S1206).

Next, from the tool information stored in the parameter storage unit 204, the working portion, which performs the working consistent with the material stored in the parameter storage unit 204, selects the tool of the first step. Next, the working portion analyzes the provisional first step lathe outer diameter shape, selects the tool of the cutting angle and the cutting edge angle with the minimum uncut portion, and memorizes the cutting edge R amount of the selected tool in the parameter storage unit 204 as the overlap amount of the first step lathe outer diameter shape (step S1207).

Next, from the tool information stored in the parameter storage unit 204, the working portion, which performs the working consistent with the material stored in the parameter storage unit 204, selects the tool of the second step. Next, the working portion analyzes the provisional second step lathe outer diameter shape, selects the tool of the cutting angle and the cutting edge angle with the minimum uncut portion, and memorizes the cutting edge R amount of the selected tool in the parameter storage unit 204 as the overlap amount of the second step lathe outer diameter shape (step S1208).

As is evident from the description above, according to embodiment 3, since the overlap amount is determined from the tool data performing the lathe in consideration of the lathe sectional shape, a smaller useless overlap amount can be automatically set.

INDUSTRIAL APPLICABILITY

The numerical control programming method and apparatus according to the present invention is suitable for being used in the case of forming the working program having on uncut portion.

REFERENCE SIGNS LIST

101: solid model
102: numerical control programming apparatus
103: working program
203: parameter input unit
204: parameter storage unit
205: part shape input unit
206: part shape arrangement unit
207: part shape storage unit
208: material shape input unit
209: material shape forming unit
210: material shape arrangement unit 211: material shape storage unit
212: first fitting shape setting unit
213: first fitting shape storage unit
214: second fitting shape setting unit
215: second fitting shape storage unit
216: step dividing position setting unit
217: step dividing position storage unit
218: working shape forming unit
219: working shape storage unit
220: lathe shape forming unit
221: lathe shape storage unit
222: lathe sectional shape forming unit
223: lathe sectional shape storage unit
224: front, back, outer diameter, and inner diameter dividing unit
225: front, back, outer diameter, and inner diameter shape storage unit
226: overlap amount determining unit
227: first/second step working sectional shape forming unit
228: first/second step working sectional shape storage unit
229: first step unnecessary shape deleting unit
230: second step unnecessary shape deleting unit
231: lathe data forming unit
232: lathe data storage unit
233: milling data forming unit
234: milling data storage unit
235: working program forming unit
236: working program storage unit

The invention claimed is:

1. A numerical control programming method of creating a working program for controlling a machine tool with a numerical control apparatus which grasps a material using a chuck of a first main spindle to perform the working of a first step and alternately grasps the material using a chuck of a second main spindle after the working of the first step to perform the working of a second step, the method comprising:
a storing step of storing a solid model of a part shape, a solid model of a material shape, a step dividing position of the step, and an overlap amount between the steps;
a lathe shape forming step of forming a solid model of a lathe shape on the basis of the solid model of the part shape;
a lathe sectional shape forming step of forming a sheet model of a lathe sectional shape on an X-Z plane on the basis of the solid model of the lathe shape;
a first and second working sectional shape forming step of forming a sheet model of the lathe sectional shape of the first step and a sheet model of the lathe sectional shape of the second step on the basis of the sheet model of the lathe sectional shape, the step dividing position, and the overlap amount;
a first step unwanted shape deleting step of selecting an edge of the step dividing position from the step dividing position and the sheet model of the lathe sectional shape of the first step, obtaining a tangential vector from the selected edge, and dividing and deleting, by the obtained tangential vector, the shape not needing to be worked in the overlap part of the lathe sectional shape of the first step from the sheet model of the lathe sectional shape of the first step; and
a second step unwanted shape deleting step of selecting an edge of the step dividing position from the step dividing position and the sheet model of the lathe sectional shape of the second step, obtaining a tangential vector from the selected edge, and dividing and deleting, by the obtained tangential vector, the shape not needing to be worked in the overlap part of the lathe sectional shape of the second step from the sheet model of the lathe sectional shape of the second step.

2. The numerical control programming method according to claim 1, wherein the overlap amount is automatically determined from an cutting edge R amount of the tool having a cutting angle and a cutting edge angle with the minimum cutting residue.

3. A non-transitory computer readable medium storing a program for causing a computer to execute the method according to claim 1.

4. A numerical control programming apparatus that creates a working program for controlling a machine tool with a numerical control apparatus which grasps a material using a chuck of a first main spindle to perform the working of a first step and alternately grasps the material using a chuck of a second main spindle after the working of the first step to perform the working of a second step, the apparatus comprising:
a storing unit that stores a solid model of a part shape, a solid model of a material shape, a step dividing position of the step, and an overlap amount between the steps;
a lathe shape forming unit that forms a solid model of a lathe shape on the basis of the solid model of the part shape;
a lathe sectional shape forming unit that forms a sheet model of a lathe sectional shape on an X-Z plane on the basis of the solid model of the lathe shape; a first and second working sectional shape forming unit that forms a sheet model of the lathe sectional shape of the first step and a sheet model of the lathe sectional shape of the second step on the basis of the sheet model of the lathe sectional shape, the step dividing position, and the overlap amount;
a first step unwanted shape deleting unit that selects an edge of the step dividing position from the step dividing position and the sheet model of the lathe sectional shape of the first step, obtains a tangential vector from the selected edge and divides and deletes, by the obtained tangential vector, the sheet model not needing to be worked in the overlap part of the lathe sectional shape of the first step from the sheet model of the lathe sectional shape of the first step; and
a second step unwanted shape deleting unit that selects an edge of the step dividing position from the step dividing position and the sheet model of the lathe sectional shape of the second step, obtains a tangential vector from the selected edge and divides and deletes, by the obtained tangential vector, the sheet model not needing to be worked in the overlap part of the lathe sectional shape of the second step from the sheet model of the lathe sectional shape of the second step.

5. The numerical control programming apparatus according to claim 4, further comprising, an overlap amount determining unit that automatically determines the overlap amount from an cutting edge R amount of the tool having a cutting angle and a cutting edge angle with the minimum cutting residue.

* * * * *